United States Patent [19]
Sakai et al.

[11] Patent Number: 5,748,797
[45] Date of Patent: May 5, 1998

[54] APPARATUS AND METHOD FOR PROCESSING AN IMAGE USING EXPANSION TO CONNECT ISOLATED NEIGHBORING IMAGE INFORMATION FOLLOWED BY COMPRESSION

[75] Inventors: Masanori Sakai; Hideaki Shimizu, both of Yokohama, Japan

[73] Assignee: Canon Kabushiki Kaisha, Tokyo, Japan

[21] Appl. No.: 536,849

[22] Filed: Sep. 29, 1995

Related U.S. Application Data

[62] Division of Ser. No. 295,152, Aug. 24, 1994, Pat. No. 5,495,348, which is a continuation of Ser. No. 671,450, Mar. 19, 1991, abandoned.

[30] Foreign Application Priority Data

Mar. 22, 1990 [JP] Japan .................... 2-072646

[51] Int. Cl.⁶ .................... G06K 9/40; H04N 1/58
[52] U.S. Cl. .................... 382/256; 382/162; 358/501; 358/530
[58] Field of Search .................... 382/256, 258, 382/267, 257, 275, 162, 167; 358/530, 532, 518, 447, 528

[56] References Cited

U.S. PATENT DOCUMENTS

| | | |
|---|---|---|
| 4,646,355 | 2/1987 | Petrick et al. .................... 382/275 |
| 4,747,156 | 5/1988 | Wahl .................... 382/257 |
| 4,833,723 | 5/1989 | Loveridge et al. .................... 382/275 |
| 4,893,188 | 1/1990 | Murakami et al. . |
| 4,931,882 | 6/1990 | Takeda et al. . |
| 4,970,562 | 11/1990 | Birnbaum et al. . |
| 5,032,928 | 7/1991 | Sakai et al. . |
| 5,113,252 | 5/1992 | Horie et al. . |
| 5,187,521 | 2/1993 | Shimizu et al. .................... 358/518 |
| 5,260,777 | 11/1993 | Kurita et al. . |
| 5,335,086 | 8/1994 | Kitamura .................... 382/275 |

*Primary Examiner*—Scott A. Rogers
*Attorney, Agent, or Firm*—Fitzpatrick, Cella, Harper & Scinto

[57] ABSTRACT

The present invention relates to an image processing apparatus and a method of forming an image by separating color information into two or more color information items. The boundary of images is compensated, the images being the images formed by an analog recording system for forming an image on a recording medium by removing a predetermined color component from an original document image and a digital recording system for forming an image on said recording medium by extracting a predetermined color component from said original document image. Therefore, if a slight positional deviation takes place between images formed by the digital recording system and the digital recording system, a want of color information can be prevented. Therefore, the deviation can be satisfactorily compensated so that an original image can be correctly reproduced.

21 Claims, 24 Drawing Sheets

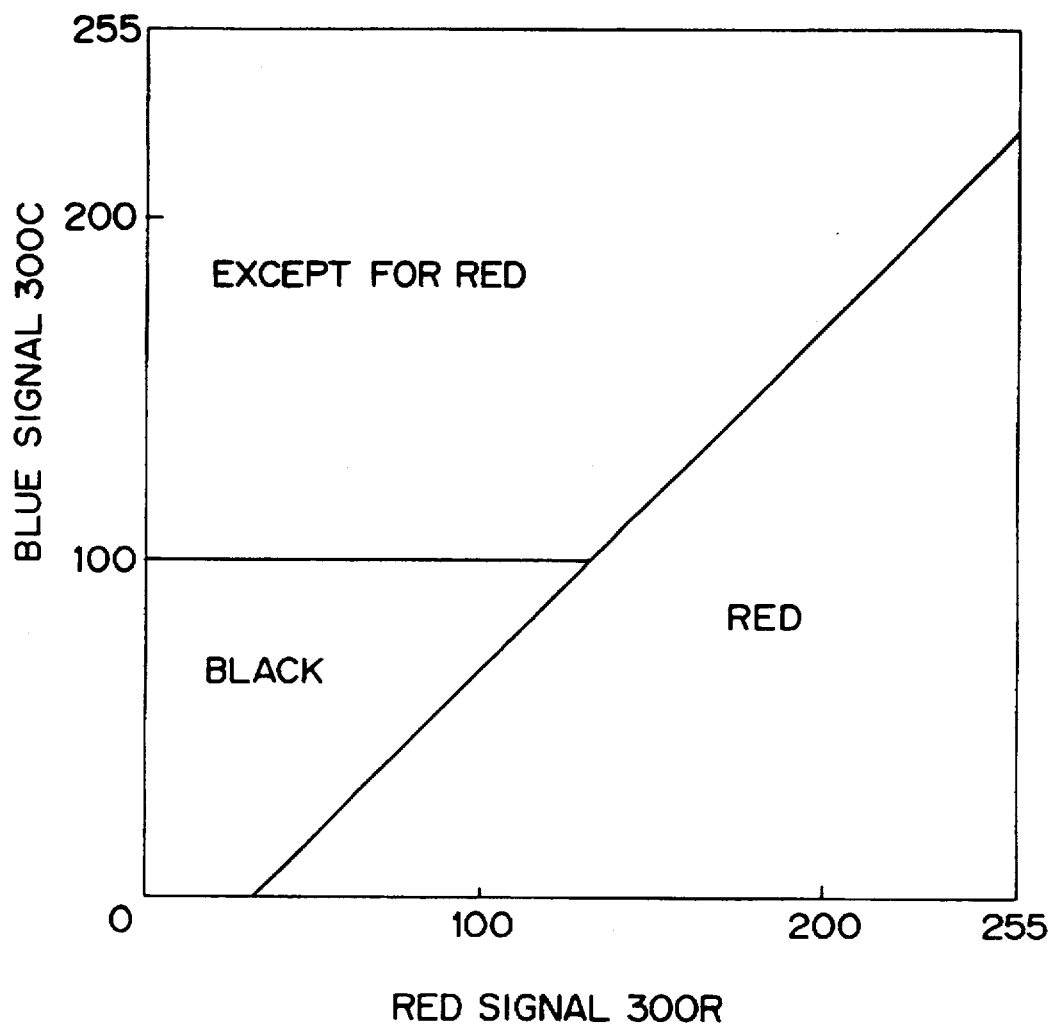
F I G. 6

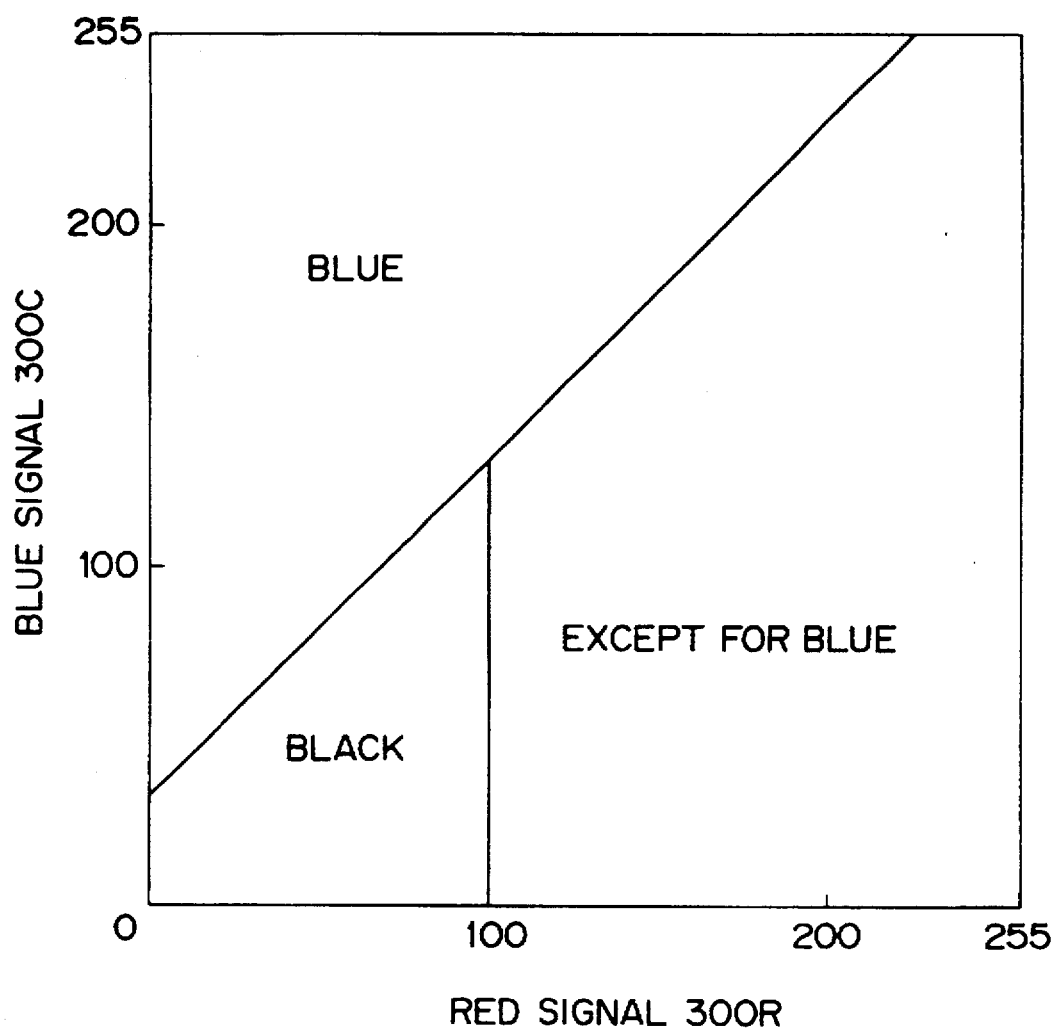
F I G. 7

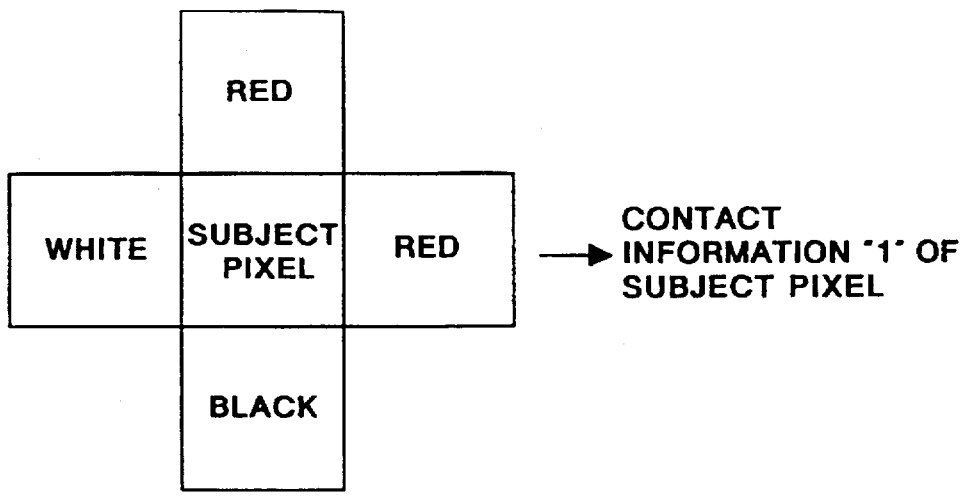
F I G. 10A
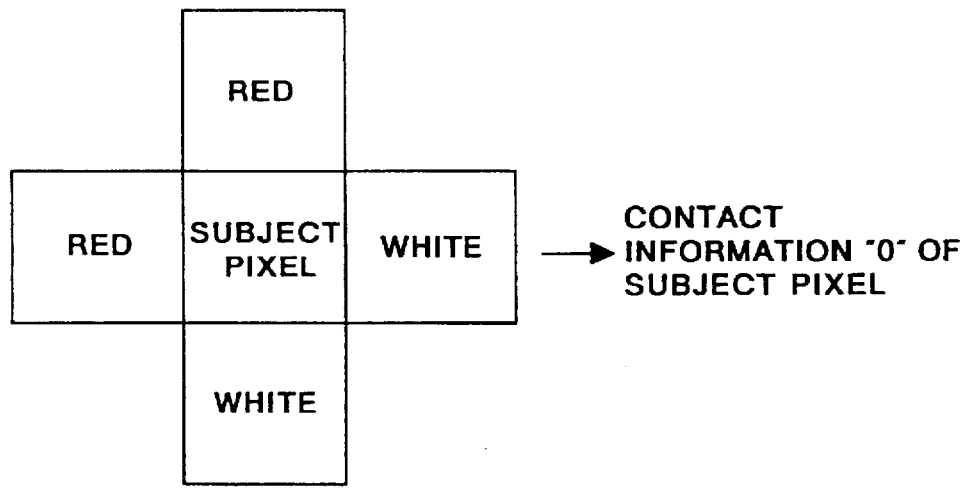
F I G. 10B
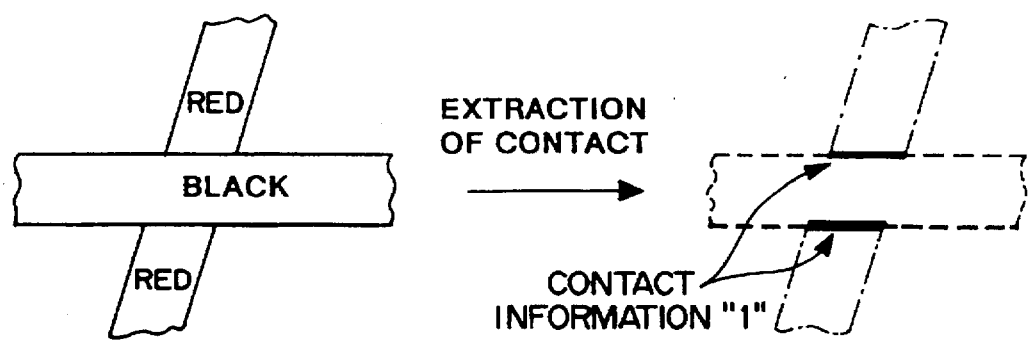
F I G. 10C

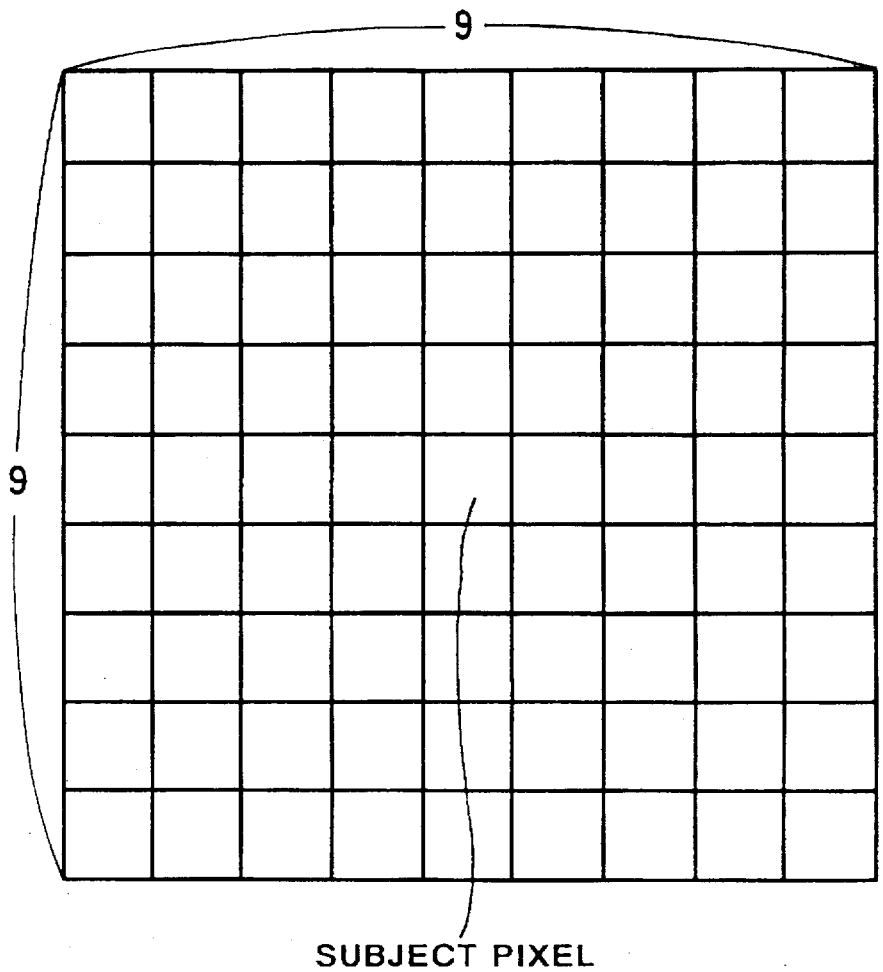
CASE WHERE CONTACT INFORMATION IS PRESENT IN A 9 × 9 MATRIX EXCEPT FOR SUBJECT PIXEL IS MADE TO BE 1
F I G. 11A EXPANSION INFORMATION A
CONTACT INFORMATION A
CONTACT INFORMATION B
EXPANSION INFORMATION B
F I G.  11B

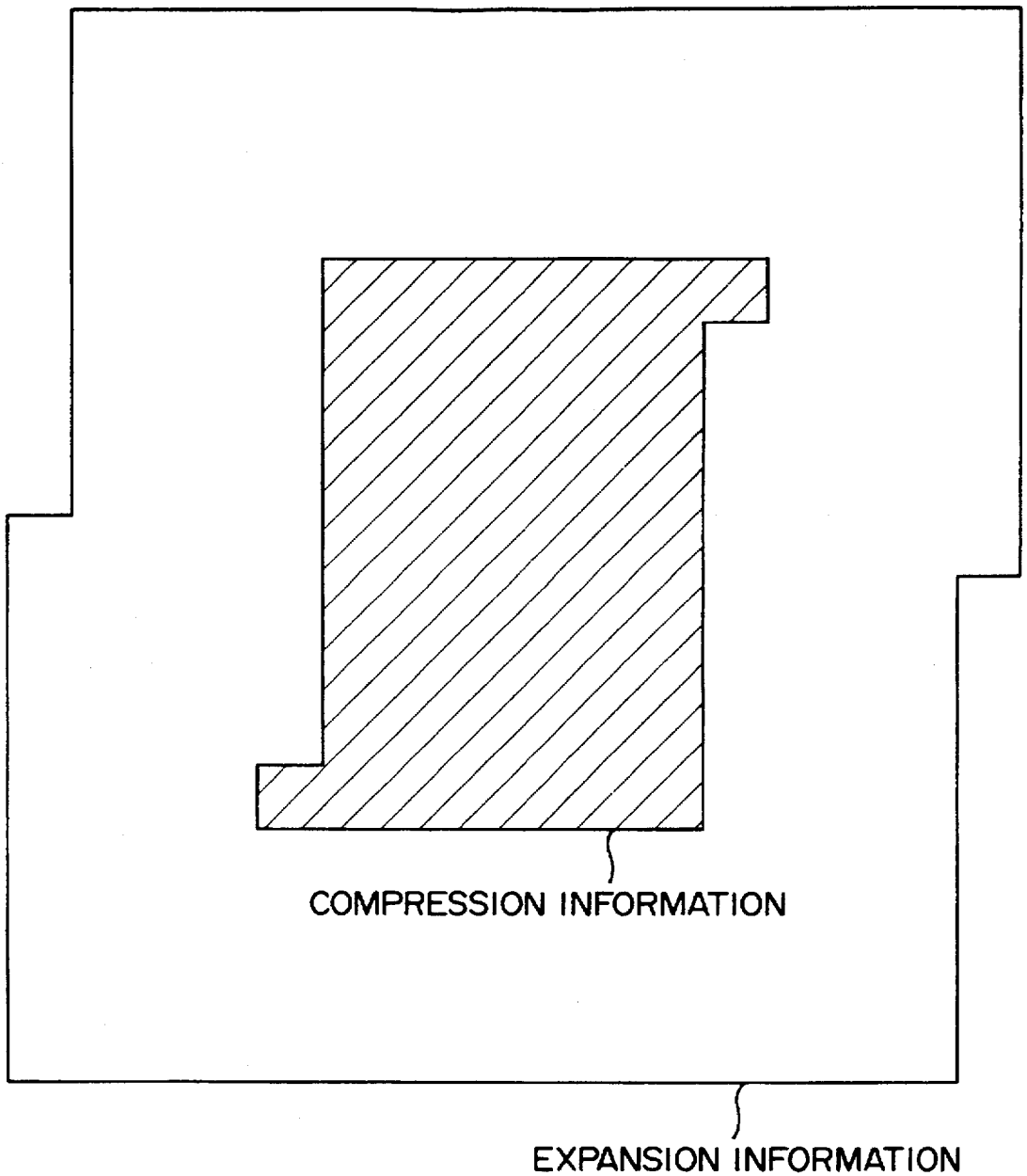
F I G. 12

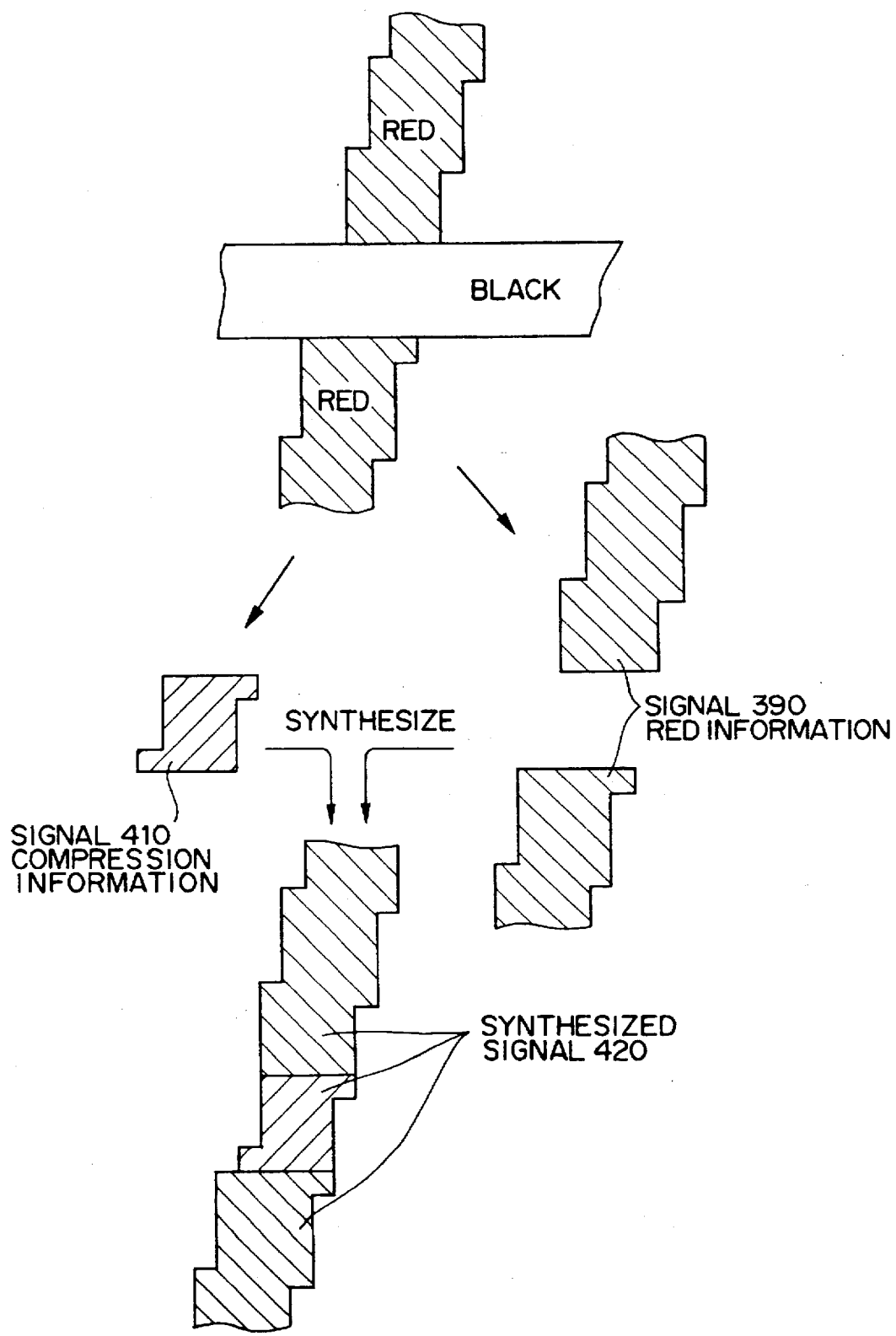
F I G. 13

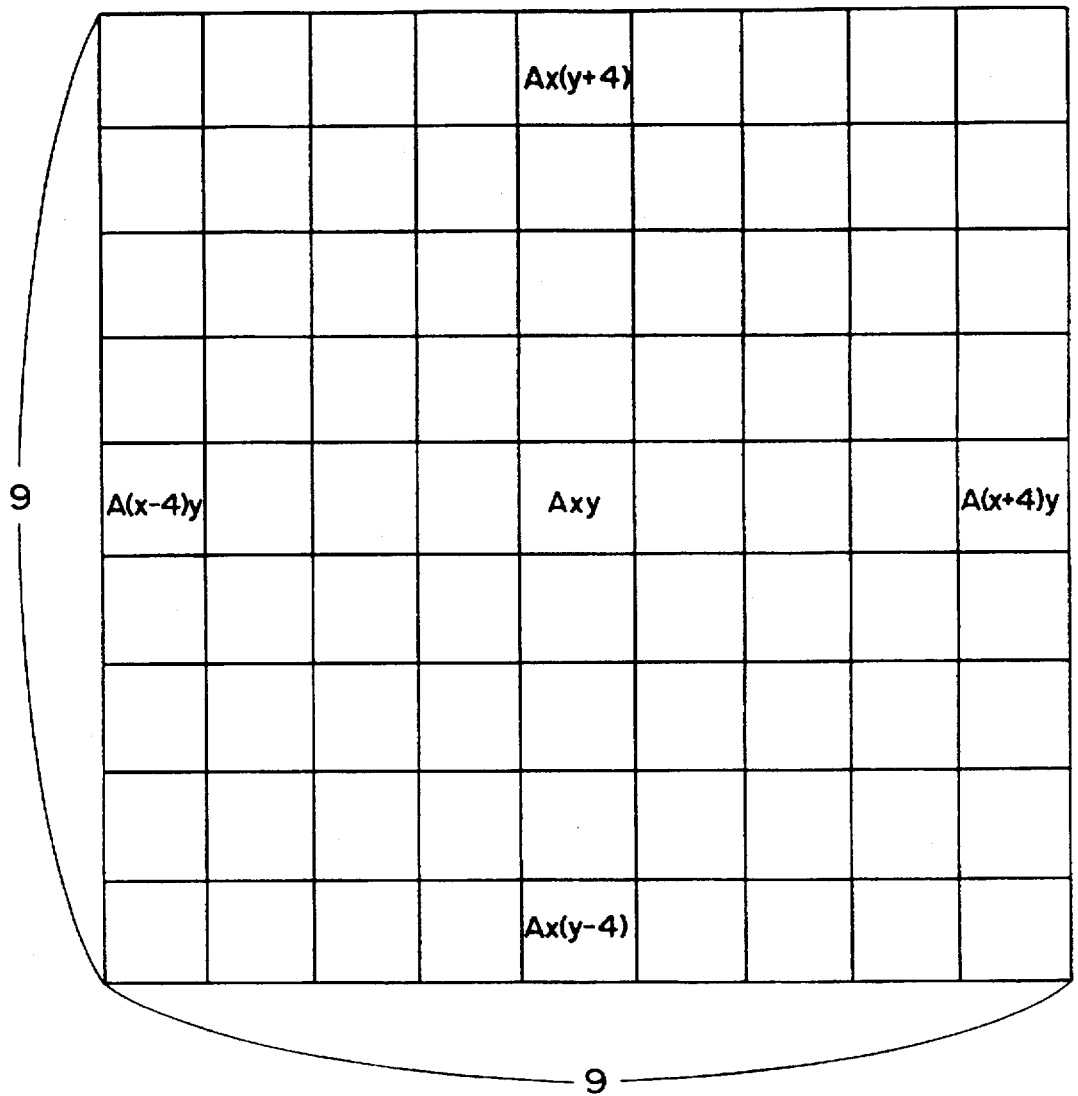
F I G. 16

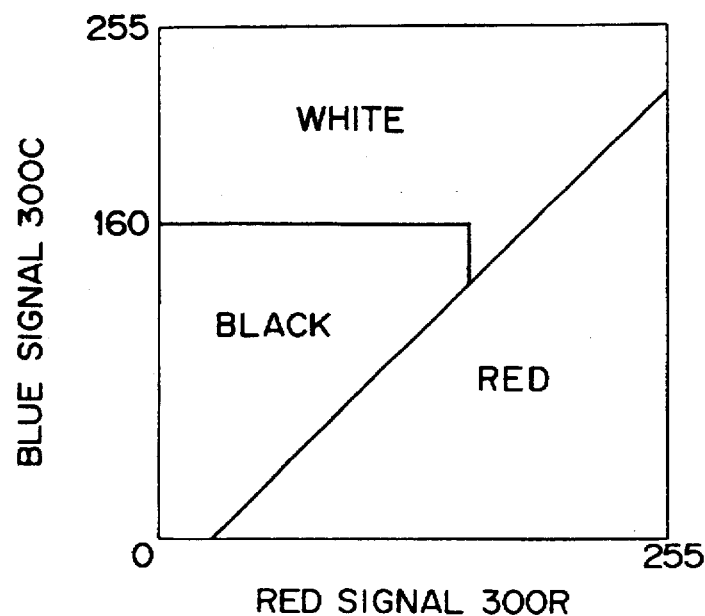
F I G. 20
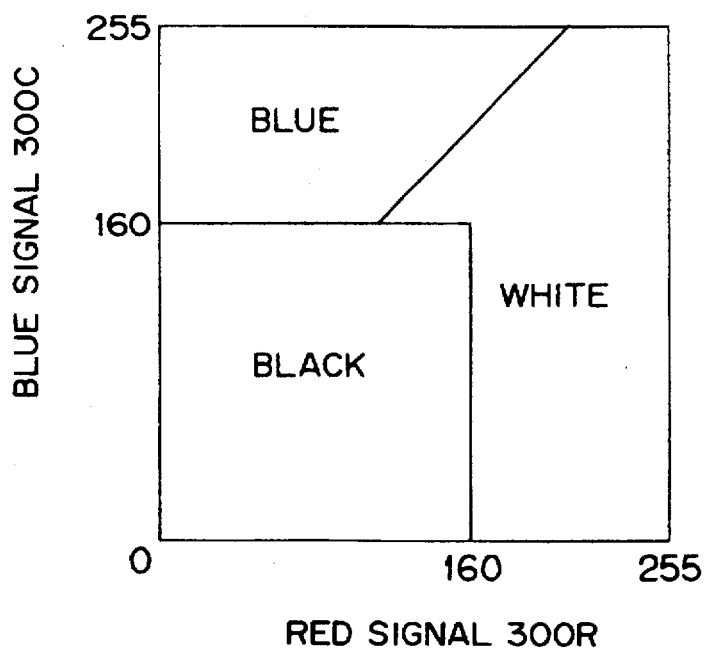
F I G. 21

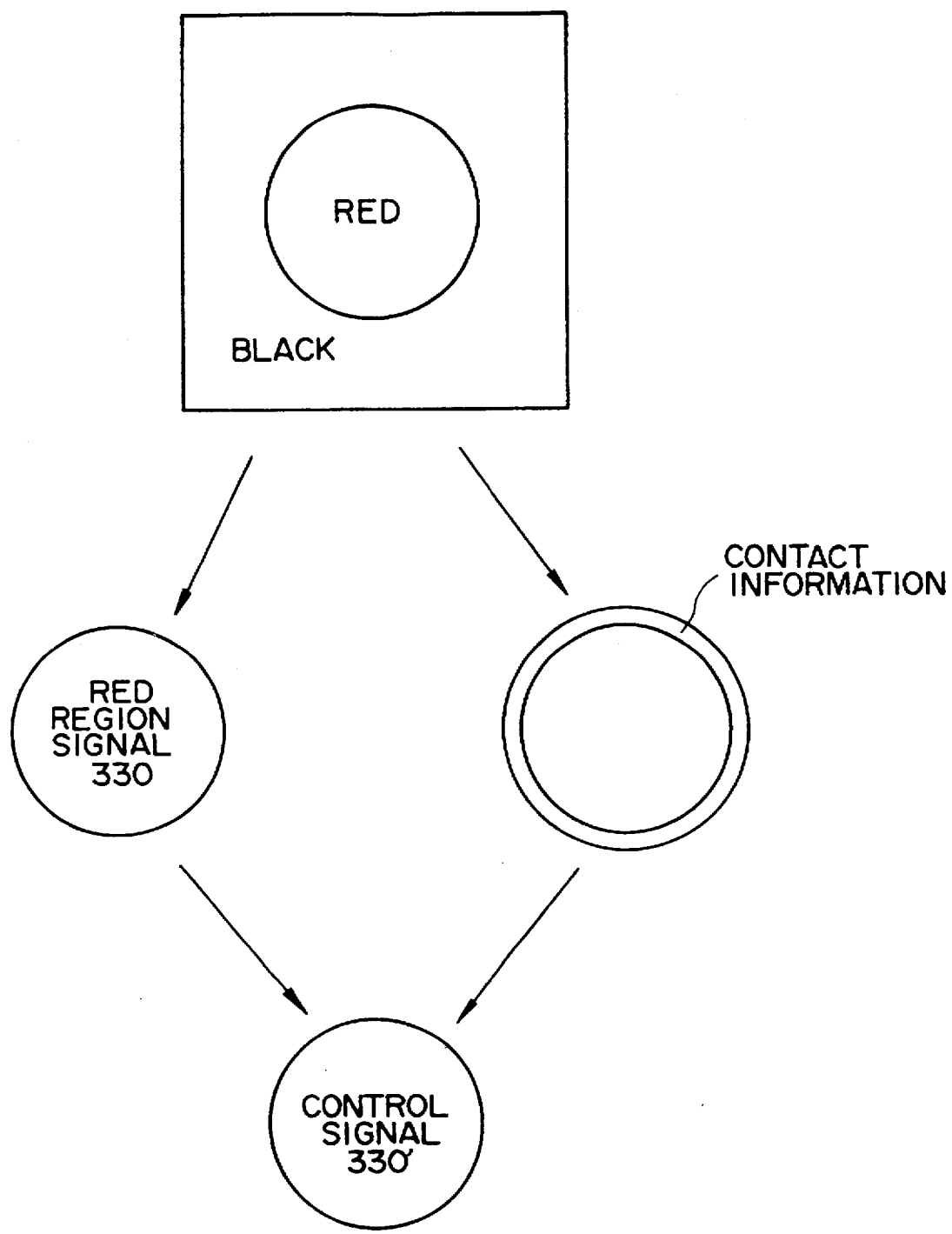
F I G. 22

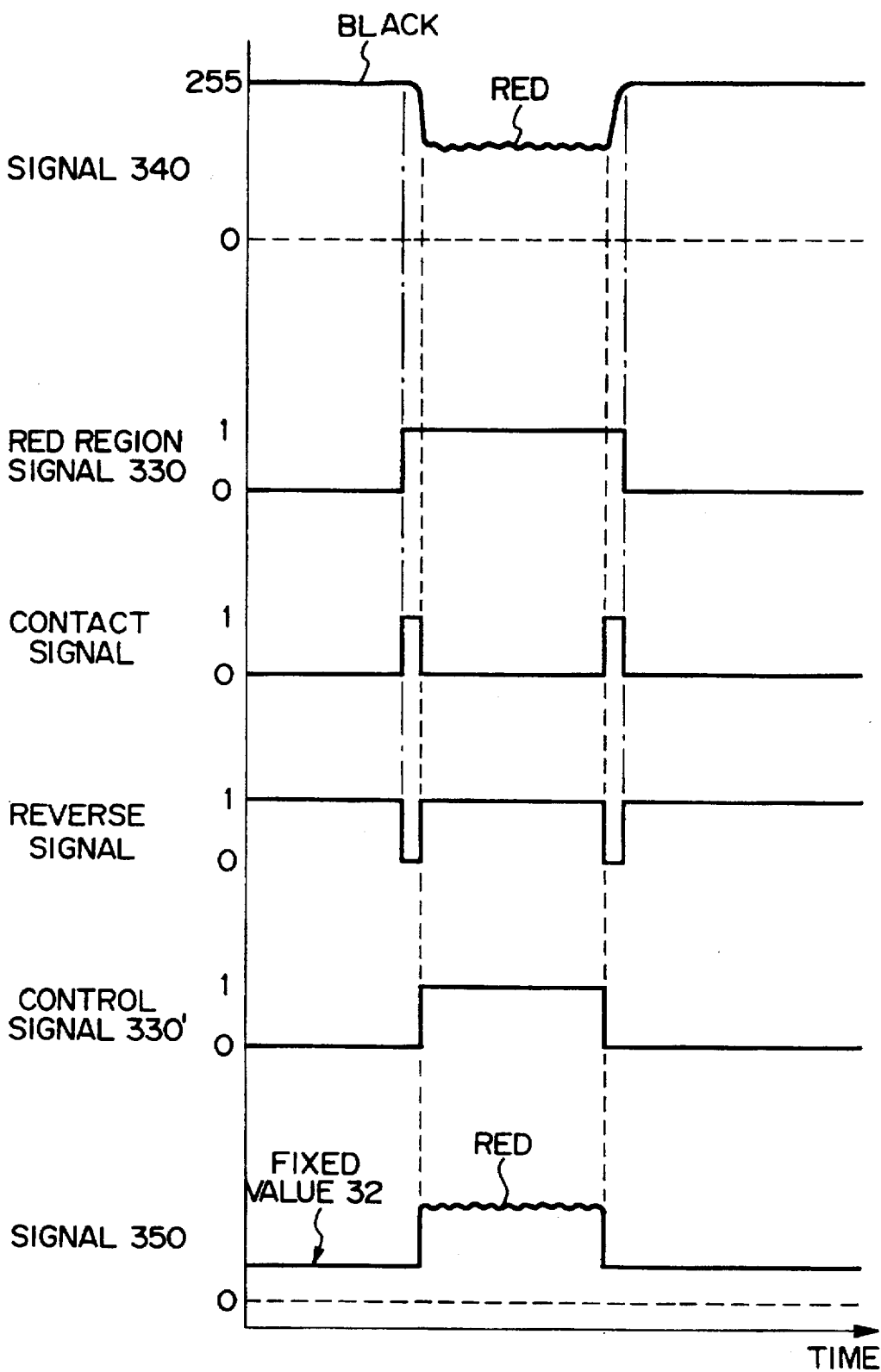
F I G. 23

APPARATUS AND METHOD FOR PROCESSING AN IMAGE USING EXPANSION TO CONNECT ISOLATED NEIGHBORING IMAGE INFORMATION FOLLOWED BY COMPRESSION

This application is a division of application Ser. No. 08/295,152, filed Aug. 24, 1994, now U.S. Pat. No. 5,495,348, which is a continuation of application Ser. No. 07/671,450, filed Mar. 19, 1991, now abandoned.

BACKGROUND OF THE INVENTION

1. Field of the Invention

The present invention relates to an apparatus and a method of processing an image, and, more particularly, to an apparatus and a method of forming an image by separating color information into a plurality of color information items.

2. Related Art

Hitherto, there has been image processing for reading an original document in which, for example, a red seal impression is made on black characters, performing a color separation operation into red color components and black color components and printing a red and black images.

Furthermore, in U.S. Pat. No. 4,931,882 (Takeda et al.), it has been suggested that the technique, in which the digital optical system erases latent image by the analog optical system, as the printing technique using two color.

However, in a case where the black image forming process and the red image forming process are performed sequentially, the above-described conventional structure encounters a problem that the formed image wants the portion of the seal impression image, which is overlapped the characters, causing the wanted red image portion to become conspicuous excessively. As a result, the quality of the formed image deteriorates excessively.

SUMMARY OF THE INVENTION

Accordingly, an object of the present invention is to provide an apparatus and method of processing image capable of correctly reproducing an image by preventing a want of color information at the time of separating a color image.

Other and further objects, features and advantages of the invention will be appear more fully from the following description.

BRIEF DESCRIPTION OF THE DRAWINGS

FIGS. 6 and 7 illustrate a color discriminating operation according to the first embodiment of the present invention;

FIGS. 10A to 10C illustrate a contact point extracting operation according to the first embodiment of the present invention;

FIG. 11A illustrates an expansion matrix according to the first embodiment of the present invention;

FIG. 11B illustrates the relationship between contact point information and expansion information according to the first embodiment of the present invention;

FIG. 12 illustrates an expansion and compression process according to the first embodiment of the present invention;

FIG. 13 illustrates an image synthesis according to the first embodiment of the present invention;

FIG. 16 illustrates a filter for an edge emphasizing process according to another embodiment of the present invention;

FIGS. 20 and 21 illustrate a color discriminating process according to the second embodiment of the present invention; and FIGS. 22 to 24 illustrate a contact extraction process.

DESCRIPTION OF THE PREFERRED EMBODIMENTS

Preferred embodiments will now be described with reference to the drawings.

<Structure>

Figure 1:
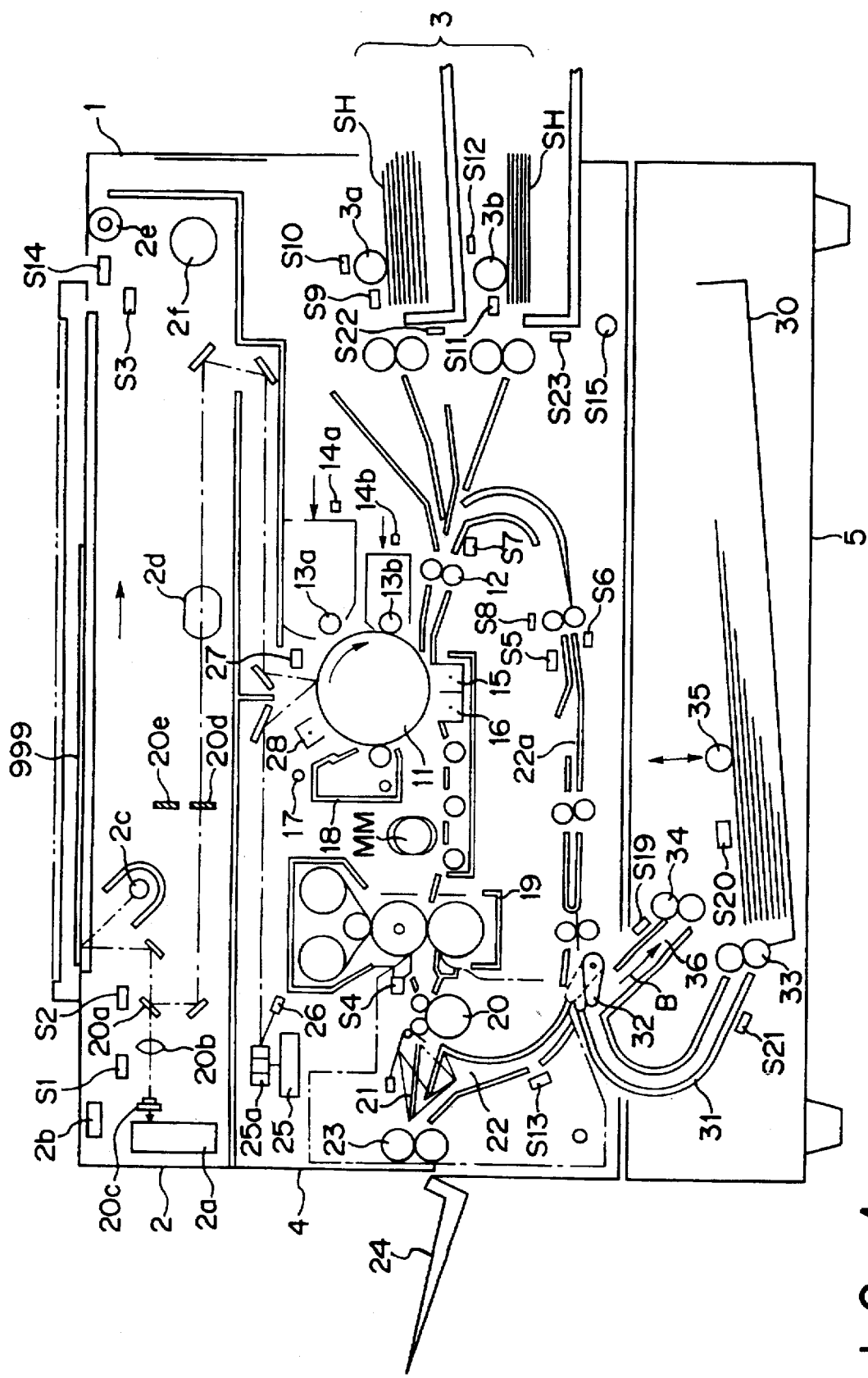
FIG. 1 is a cross-sectional structural view which illustrates an embodiment of an image forming apparatus according to the present invention.

FIG. 1 is a cross sectional view which illustrates the structure of an embodiment of an image forming apparatus according to the present invention. The image forming apparatus according to the embodiment of the present invention comprises a copying apparatus body 1, an original document scanning section 2, a paper supplying section 3, image recording section 4, an intermediate tray section 5 and the like.

First, the structure of the original document scanning section 2 will be described.

Reference numeral 2a represents a controller which comprises a control unit for controlling the overall copying sequence and an image processing unit for processing an image signal read by a CCD line sensor 20c.

Reference numeral 2b represents a power supply switch and 2c represents an original-document exposing lamp which constitutes an optical scanning system in association with a scanning mirror, the original-document exposing lamp being arranged to move at a predetermined speed for scanning the original document. Reference numeral 20a represents a half mirror which allows light to pass through a CCD imaging lens 20b before light is then photoelectrically converted into an image electric signal by a CCD line sensor 20c before it is supplied to the above-described image processing unit of the controller 2a to be described later. Light reflected by the half mirror 20a passes through a red filter 20d for eliminating a red color component or a blue filter 20e for eliminating a blue color component which may be omitted from the structure together with a shutter.

Reference numeral 2d represents an imaging lens for imaging reflected light onto a photosensitive drum 11 of the image recording section 4 (an analog image recording process). Reference numeral 2e represents a buzzer for alarming a copying mode error or the like set in an operating unit to be described later. Reference numeral 2f represents an optical system driving motor (an optical motor) for precisely driving the optical scanning system or the like.

Then, the paper supplying section 3 will now be described.

Reference numerals 3a and 3b represent paper supplying rollers for supplying a cut sheet SH into the image recording section 4.

Then, the structure of the image recording section 4 will now be described.

Reference numeral 12 represents resist rollers for temporarily stopping the movement of the cut sheet SH supplied as a result of the actions of the paper supplying rollers 3a and 3b so as to be synchronized with the front portion of the image before the resist rollers 12 again supply the cut sheet SH.

Reference numerals 13a and 13b represent developing units which respectively accommodate red and black developers. When a solenoid 14a or 14b is operated, the corresponding developing unit 13a or 13b is brought to a position adjacent to the photosensitive drum 11 and the other developing unit 13a or 13b is moved away from the photosensitive drum 11. In a case where a multiple development is performed, the controller 2a controls the operations of the solenoids 14a and 14b.

Reference numeral 15 represents a transfer charger for transferring a toner image developed by the developing units 13a and 13b onto the cut sheet SH. The transfer charger 15 subsequently causes a separation charger 16 to separate the cut sheet SH from the photosensitive drum 11 after the toner image has been transferred as described above. Reference numeral 17 represents a pre-exposure lamp for neutralizing the surface potential of the photosensitive drum 16 so as to cause it to prepare for primary charging. Reference numeral 18 represents a cleaner device comprising a cleaning blade and cleaning rollers so that toner left on the surface of the photosensitive drum 11 is recovered.

Reference numeral 19 represents a fixing device for fixing the toner image transferred, to the cut sheet SH by heat and pressure. Reference numeral 20 represents conveying rollers for conveying the cut sheet SH, which has been subjected to the above-described fixing process, to a paper delivery tray 24.

In a case where multiple copying is performed, a flapper 21 is previously shifted to a position designated by a dashed line due to an action of a solenoid (omitted from illustration). In consequence, the cut sheets SH passe through a conveyance passage 22 after they have been supplied, transferred, separated and fixed, the cut sheets SH being then successively conveyed to a conveyance passage 22a. Subsequently, the paper sheet SH is detected by a sensor S5 before it is further detected by sensors S6 and S8 so as to be laterally aligned by a solenoid for aligning the lateral resist.

In response to a multiple copy command issued from an operating unit 41, resist rollers 12 are operated so that the cut sheet SH is sent to a position which corresponds to the resist rollers 12. Subsequently, the cut sheet SH is, similarly to the above-described actions, delivered to the paper delivery tray 24.

When two-sided copying is performed, the transfer sheet is delivered by the delivery rollers 23 similarly to the above-described ordinary copying action. However, the delivery rollers 23 are rotated inversely after the rear end of the cut sheet SH has passed through the flapper 21. In consequence, the cut sheet SH is guided so as to be introduced into the conveyance passage 22. The above-described inverse rotation is performed by a solenoid which controls the direction of the rotation of the delivery rollers 23. The ensuing operation is performed similarly to the above-described multiple copying.

As described above, the cut sheet SH is temporarily delivered by the delivery rollers 23 and is subsequently sent in the conveyance direction 22a while turned over by the inverting action of the delivery rollers 23.

Thus, the single copying and two-sided copying are performed as described above. In a case of a multiply copying operation of a plurality of sheets or a two-sided copying operation of the same, the intermediate tray section 5 is used. As shown in FIG. 1, the intermediate tray section 5 has an intermediate tray 30 for temporarily accommodating the cut sheet SH positioned in the conveyance passage 31. In the case of the multiple copying operation of a plurality of sheets, the fixed cut sheet SH is temporarily delivered by the delivery rollers 23 similarly to the single copying mode. Subsequently, the delivery rollers 23 are inverted so as to be accommodated in the intermediate tray 30 via the conveyance passage 22, the flapper 32 and the conveyance passage 36.

The above-described operation is repeated so that all of the cut sheets SH for one side are accommodated in the intermediate tray 30. Subsequently, supplying rollers 33 are rotated in response to the next copying command, causing copying of the other side to be performed via the conveyance passage 36.

In the case of the two-sided copying of a plurality of sheets, the cut sheets SH are sent from the fixing device 19 to the intermediate tray 30 so as to be accommodated in the same via the conveyance passages 22 and 36 by the action of the flapper similarly to the case of the multiple copying of one sheet.

Since the ensuing operation is the same as that performed in the multiple copying mode, a further description is omitted here.

Reference numeral 25 represents a scanner motor for rotating a polygonal mirror 25a at a predetermined speed so as to polarize a laser beam emitted from a semiconductor laser 26.

The scanner motor 25, the semiconductor laser 26 and the like constitute a digital scanning unit which emits a laser beam which corresponds to digital image information supplied from the image processing unit of the controller 2a so as to, as an overlapped image, record the image obtained due to the above-described analog image recording and the digital image recording. Furthermore, the digital scanning unit applies a laser beam to a latent image region recorded on the surface of the photosensitive drum 11 so that the latent image is selectively erased.

Reference numeral 27 represents an exposing shutter for shutting a portion or the overall portion of reflected image light so that forming of the latent image is prevented. Reference numeral 28 represents a primary charger.

Referring to the drawing, reference numerals S1 to S15 and S19 to S23 represent sensors. The sensor S1 detects the home position of the optical system, which serves as the analog scanning unit, the home position being the position at which the optical system is stopped during standby. The sensor S2 detects that the optical system has moved to a position at which it confronts the front portion of the original document image. As a result, an output is transmitted from the sensor S2 so as to control the timing of the copying sequence. The sensor S3 detects the position (the inverting position) of a limiter at the time of the maximum scanning. The optical system reciprocates for a scanning distance which corresponds to the cassette size or the reproduction ratio instructed through the operating unit.

Figure 2:
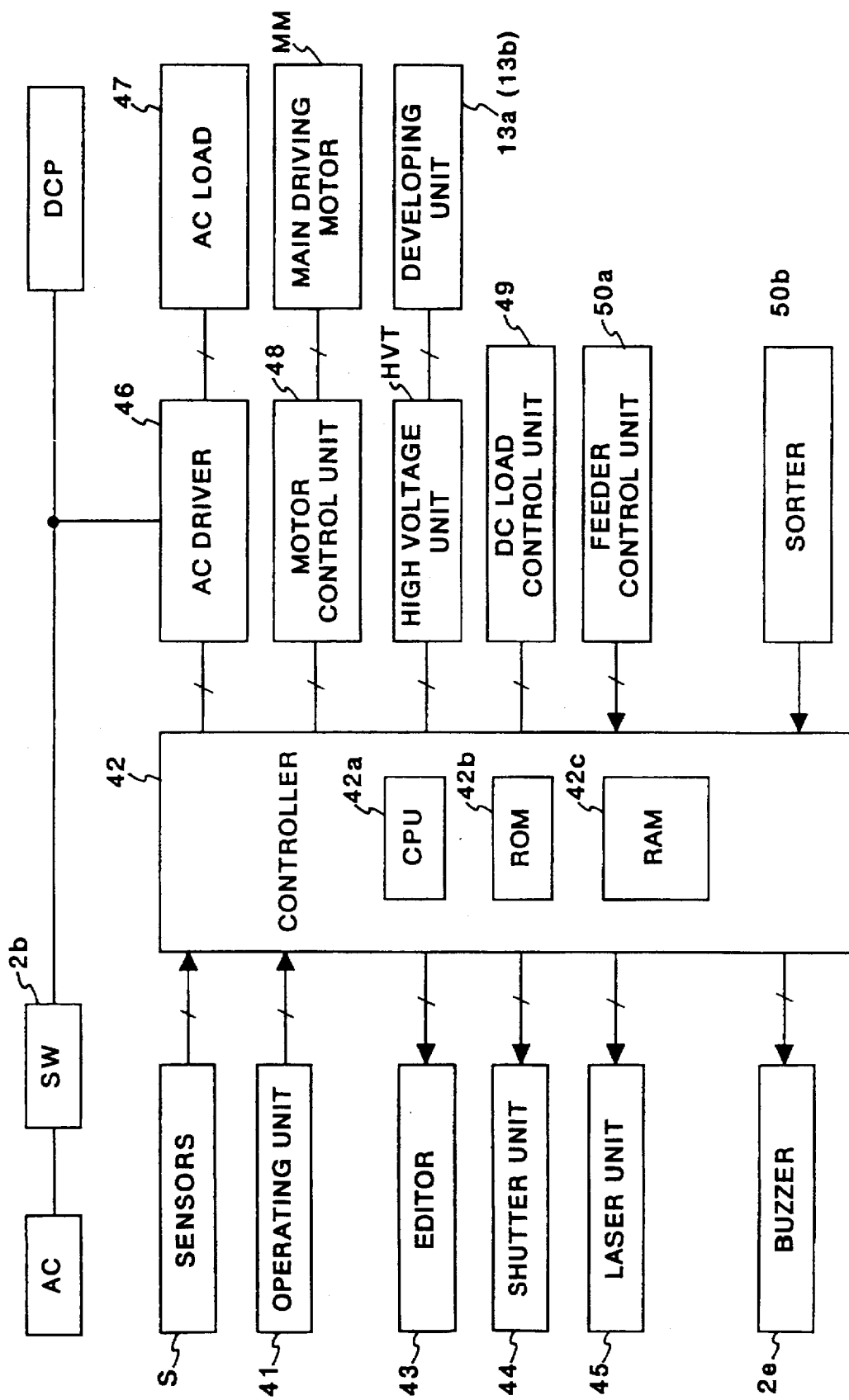
FIG. 2 is a block diagram which illustrates the structure of a controller of the image forming apparatus shown FIG. 1.

FIG. 2 is a block diagram which illustrates the structure of the controller 2a shown in FIG. 1, where the same elements as those shown in FIG. 1 are given the same reference numerals.

Referring to FIG. 2, reference numeral 41 represents an operating unit, the operating unit 41 having a key for selecting a copy mode (single sided, two-sided, multiple copy or the like) and a reproduction mode (reproduction ratio, size of sheets or the like). Furthermore, the operating unit 41 has a first mode setting key through which a first recording mode is set, the first recording mode being a mode in which digital information, which has been previously stored by the digital scanning unit, is caused to overlap with all of the original documents supplied from an ADF (Automatic Document Feeder). Furthermore, the operating unit 41 has a second mode setting key (to be described later) through which a second recording mode is set, the second recording mode being a mode in which digital information, which has been previously stored by the digital scanning unit, is caused to overlap with a selected original document supplied from the ADF.

Reference numeral 42 represents a control unit comprising a CPU 42a, a ROM 42b, a RAM 42c and the like and arranged to totally control the copying sequence in accordance with a control program stored in the ROM 42b. Reference numeral 43 represents an editor for inputting a selected area of the original document. Reference numeral 44 represents a shutter unit comprising the exposing shutter 27 and a solenoid. Reference numeral 45 represents a laser unit comprising the semiconductor laser 26, the scanner motor 25 and the like. Reference numeral 46 represents an AC driver for supplying AC power to an AC load 47 such as the original document exposing lamp 2c. Reference numeral 48 represents a motor controlling unit for controlling the solenoids 14a and 14b, a clutch, a fan and the like.

Reference numeral 50a represents a feeder controlling unit for controlling the operation of the original document supplying portion. Reference numeral 50b represents a sorter for delivering the cut sheet SH sent by the delivery rollers 23 into a delivery bin. Symbols HVT represents a high voltage unit for applying voltage of a predetermined potential to the charging system and the developing sleeve of each of the developing units 13a and 13b.

Symbol DCP represents a DC power source for supplying a controlling potential [+5V] to the controller 2a or the like.
<Operation>

Then, the operation of the image processing apparatus according to this embodiment will now be described with reference to the drawings.

When the power switch 2b is switched on, a heater provided in the fixing device 19 is operated by the controller 2a. Then, a fact that the temperature of the fixing roller has been raised to a predetermined temperature at which the fixing roller is able to perform its fixing operation is waited for (waiting time). When the temperature of the fixing roller has been raised to the predetermined temperature, the main driving motor MM is rotated for a predetermined time so that the photosensitive drum 11 and the fixing device 19 are operated. In consequence, the temperature of the entire surface of each of the rollers in the fixing device 19 is set to a constant temperature (wait suspending rotation). Subsequently, the main driving motor MM is stopped and the apparatus in a state where it is able to commence the copying operation is allowed to wait for the operation start (stand by state). At this time, the main driving motor MM operates the photosensitive drum 11, the fixing device 19, the developing units 13a and 13b and a variety of rollers for conveying transfer paper. When a copy command is supplied from the operating unit 41, the copying sequence is started.

In the case where the ordinary image recording operation is performed, the optical filters 20d and 20e are not used but a latent image is formed on the photosensitive drum 11. At this time, the laser 26 may be applied to an optional region of the image which has previously been set so as to erase the optional partial region. In the red component erasing mode, the optical red filter 20d is interposed into the passage through which light reflected from the original document passes through so that image recording is performed while erasing the red color component. Similarly, the optical blue filter 20e is used in the blue component erasing mode.
<First Embodiment>

Then, a first embodiment in which red and black components are automatically separated from each other will be sequentially described below.

Figure 3:
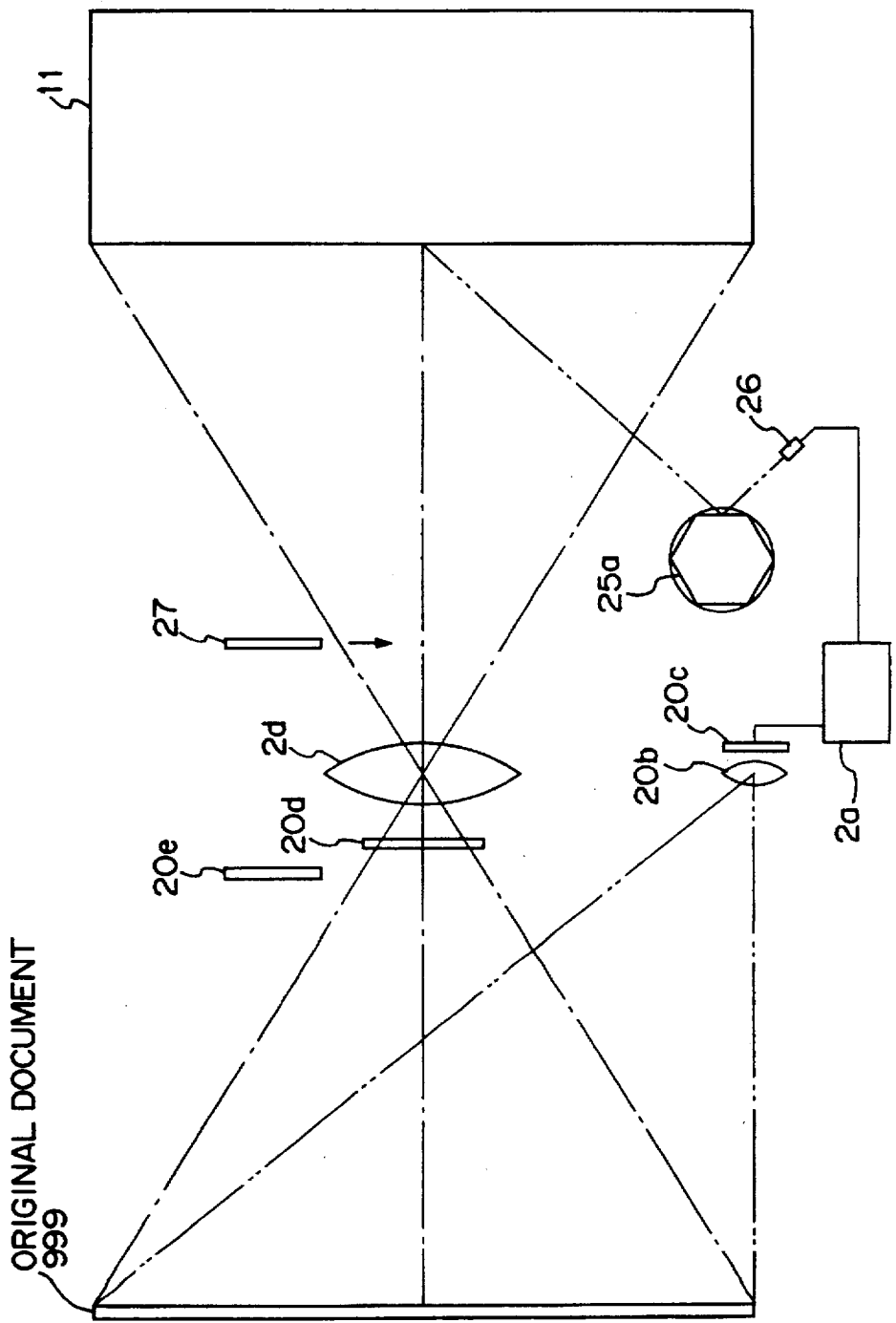
FIG. 3 illustrates a scanning operation of an original document.

(1) Forming of the latent image of a black image (2) Development of the black latent image (3) Forming of the latent image of a red image (4) Development of the red latent image (1) Forming of the latent image of a black image An operation of forming the latent image of a black image onto the photosensitive drum 11 will be described with reference to FIGS. 1 and 3.

In this case, the optical red filter 20d is disposed in front of the imaging lens 2d for the purpose of separating the red component as the operation to be performed previously to forming the latent image of the black image. When the original document exposing lamp 2c and the scanning mirror are moved by the optical system driving motor (the optical motor) 2f in a direction designated by an arrow shown in FIG. 1, light emitted from the original document exposing lamp 2c is applied to an original document 999 so that the original document 999 is scanned. Light reflected from the surface of the original document 999 is reflected by the half mirror 20a so as to be supplied to the optical red filter 20d so that red information in the original document 999 is erased. Reflected light from which the red information has been erased passes through the imaging lens 2d so as to be imaged on the photosensitive drum 11.

Thus, information of the original document 999 from which the red information has been erased is imaged as a latent image on the photosensitive drum 11.

(2) Development of a black image

Then, development of black image will now be described with reference to FIGS. 1 and 3.

As shown in FIG. 1, when the cut sheet SH is supplied to the image recording section 4 by the paper supplying rollers 3a and 3b, the latent image on the above-described drum 11 from which red information has been omitted is developed by the black developing unit 13a so as to be transferred to the surface of the cut sheet SH. After the above-described transference has been completed, the cut sheet SH is separated from the photosensitive drum 11 by the separation charger 16. The toner left on the surface of the drum 11 is recovered by the cleaning device 18.

The cut sheet SH which has been subjected to the above-described developing and separation processes is conveyed to the fixing device 19 in which a black toner image formed on the cut sheet SH is fixed by heat and pressure so that black information is recorded. The cut sheet SH on which the black information has been recorded is introduced into the conveyance passage 22 by the flapper 21. Subsequently, the cut sheet SH is conveyed to the resist rollers 12 via the conveyance passage 22a before it is caused to wait for the fact that the latent image is formed and the image is developed.

(3) Forming of the latent image of red image

Then, a process of forming the latent image of a red image on the photosensitive drum 11 will now be described with reference to FIGS. 1 and 3.

As a previous operation to the process of forming the latent image of a red image, the shutter shown in FIG. 1 is closed, causing optical information supplied from the imaging lens 2d to be shut off. When the original document exposing lamp 2c and the scanning mirror are, at this time, moved by the optical system driving motor (the optical motor) 2f in a direction designated by an arrow shown in FIG. 1, light is applied from the original document exposing lamp 2c to the surface of the original document 999 so that the original document 999 is scanned. Light reflected from the original document 999 passes through the half mirror 20a before it is imaged on the CCD line sensor 20c by the lens 20b. Subsequently, the CCD line sensor 20c will now be described with reference to FIG. 4.

<CCD line sensor (FIG. 4)>

Figure 4:
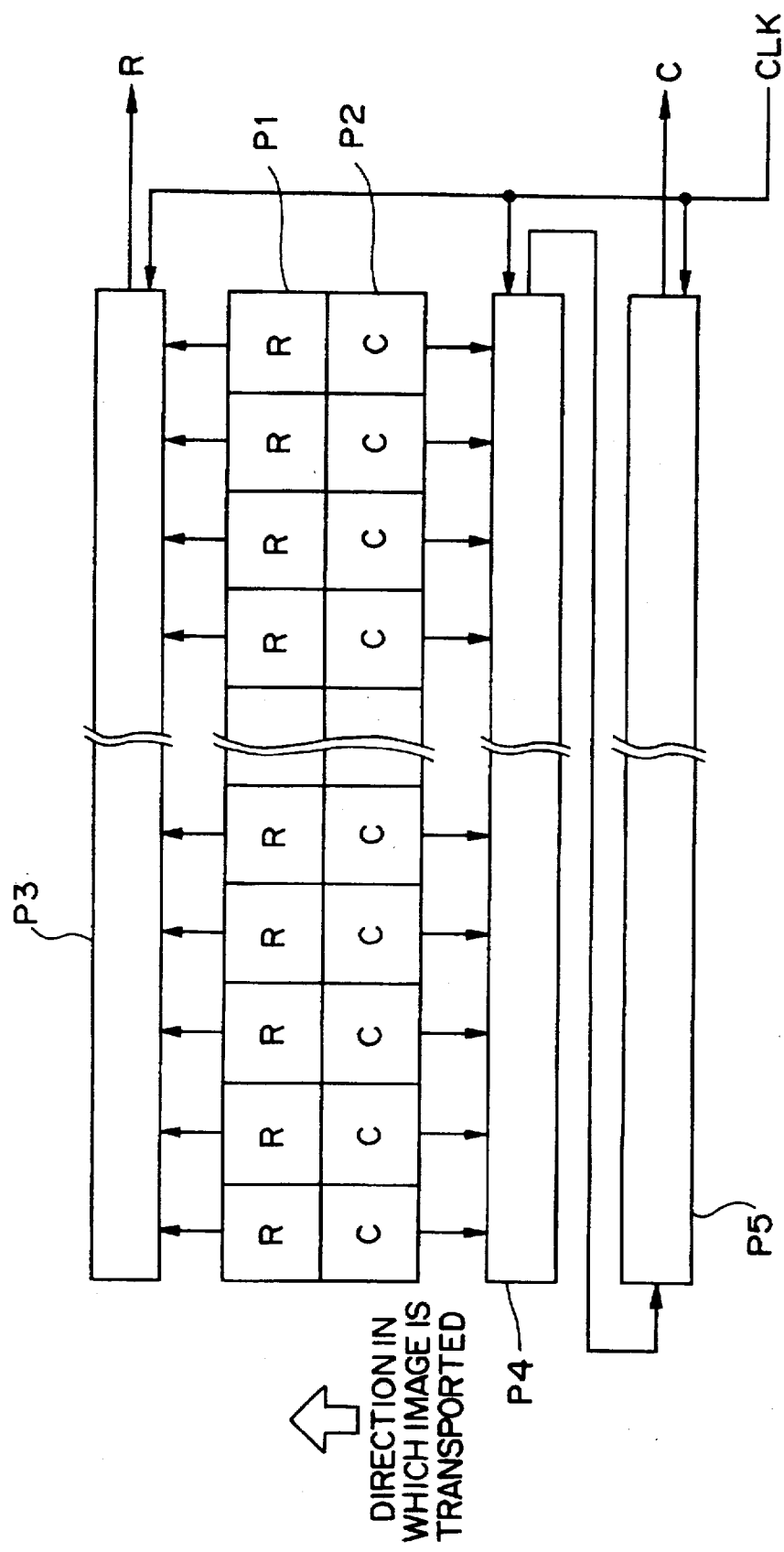
FIG. 4 illustrates the structure of a CCD line sensor.

As shown in FIG. 4, the CCD line sensor 20c comprises a line sensor P1 to which a red optical filter is installed and a line sensor P2 to which a Cyan optical filter is installed. Charges, which have been respectively charged in the two line sensors P1 and P2 for a predetermined time and which correspond to all of the pixels, are collectively shifted to shift registers P3 and P4 so as to be shifted by a shift clock CLK. As a result, the shift register P3 transmits it as a signal R, while the same transmits a signal C. Since the signal C reads the image faster than the signal R by one line because the paper is transported in a direction designated by an arrow shown in FIG. 4, the degree of the advancement of the signal C is absorbed by a line buffer P5 for one line so that the phase of the signal C is aligned to that of the signal R.

The signals R and C transmitted from the CCD line sensor 20c are respectively supplied to the controller 2a in the form of analog electric signals. Then, image processing to be performed in the controller 2a will be described with reference to a block diagram shown in FIG. 5.

Figure 5:
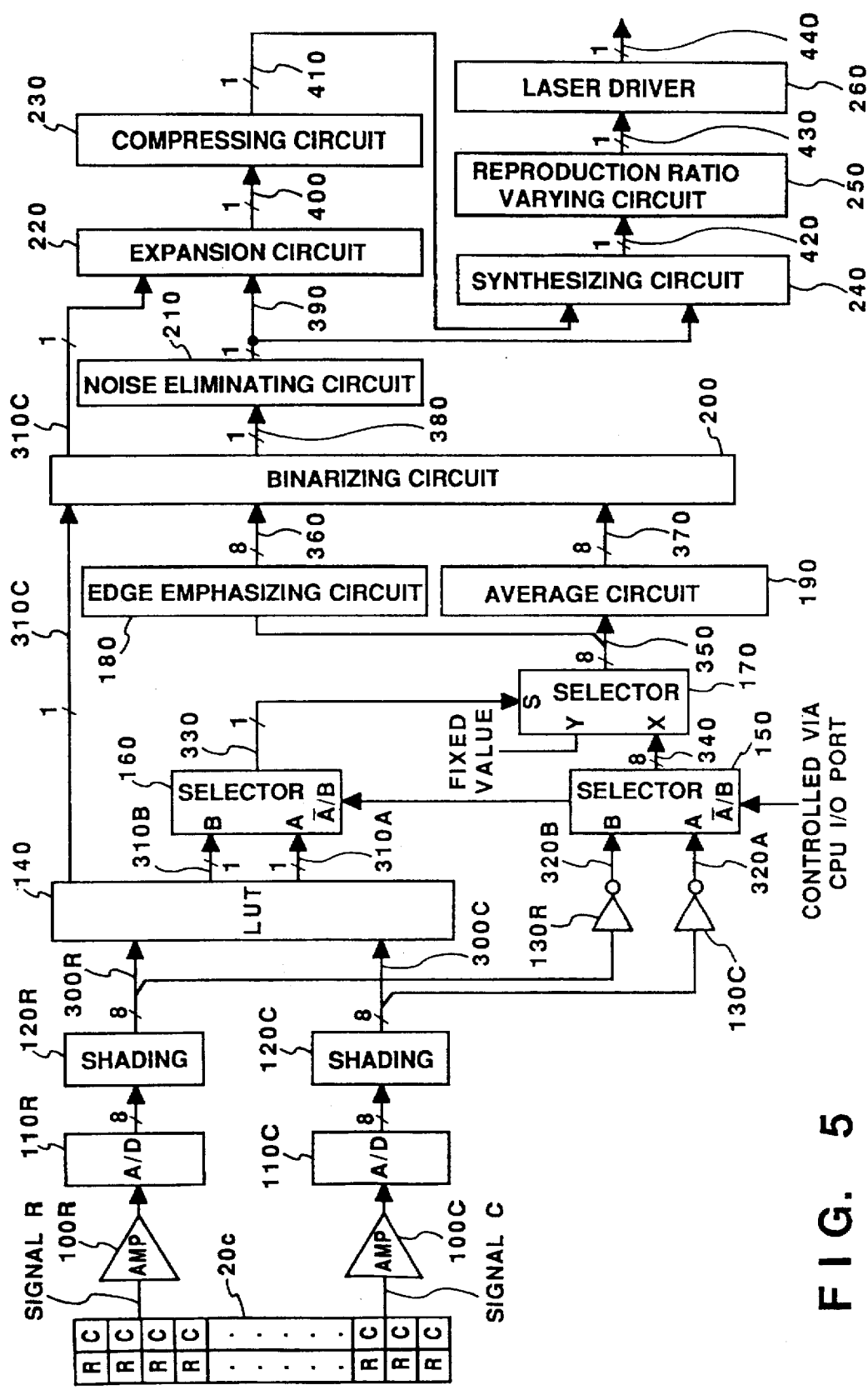
FIG. 5 is a block diagram which illustrates an image processing operation according to a first embodiment of the present invention.

As shown in FIG. 5, the signals R and C transmitted from the CCD line sensor 20c are supplied to corresponding amplifiers 100R and 100C. The amplifiers 100R and 100C amplify the corresponding signals R and C in such a manner that the output from each of the amplifiers 100R and 100C becomes the full scale at ensuing A/D converters 110R and 110C when the CCD line sensor 20c reads a white plate (omitted form illustration) provided in the original document scanning section 2.

Analog signals amplified by the amplifiers 100R and 100C are converted into digital signals by the ensuing A/D converters 110R and 110C so that 8-bit digital information is obtained. The outputs from the A/D converters 110R and 110C are supplied to shading circuits 120R and 120C in which irregular sensitivity levels of the CCD line sensor 20c, nonuniform light quantities of the original document exposing lamp 2c and the like are corrected. The outputs from the shading circuits 120R and 120C are respectively supplied to a look up table (LUT) 140 and inverting circuits 130R and 130C.

The LUT 140 transmits color discriminating signals 310A, 310B and 310C from supplied red digital information 300R (8-bit and 256 gradations signal) and blue digital information 300C (8-bit and 256 gradations signal). FIGS. 6 and 7 illustrate a color discriminating operation to be performed in the LUT 140.

FIG. 6 illustrates a table for transmitting the above-described red discriminating signal 310A and the black discriminating signal 310C. Similarly, FIG. 7 illustrates a table for transmitting the above-described blue discriminating signal 310B and the blue discriminating signal 310C. For example, if the red signal 300R is "200" and the blue signal 300C is "100" as shown in FIG. 6, the red discriminating signal 310A is "1" since the above-described values are in the red region. On the contrary, as shown in FIG. 7, since the same values are in the region except for blue, the blue discriminating signal 310B is "0".

The LUT shown in FIG. 6 is used to discriminate red and black components in a red and black printing mode. The LUT shown in FIG. 7 is used to discriminate the blue and black components in a blue and black printing mode. However, the contents of the table, more, particularly, to how the boundary is set is not limited to that shown in FIGS. 6 and 7.

Referring to FIG. 6, if a region which is discriminated to be red is enlarged, a region of the phase which is discriminated to be red also is enlarged. Therefore, a structure may be employed in which a plurality of tables (ROM,RAM etc,) for discriminating red and black but having different boundaries are selected in accordance with a desire of a user.

The tables shown in FIGS. 6 and 7 are constituted in such a manner that they have a boundary which coincides with the distribution of color information which can be eliminated by the optical system filter 20C. Since the range in which blue color information which can be erased by the blue filter is present is smaller than that erased by the red filter, the range in which color information which can be erased by the optical filter is present and a range in which color information to be extracted in a digital manner is present can be made to be the same if structures shown in FIGS. 20 and 21 are employed. That is, the region which is shown in FIG. 20 and which is discriminated to be red is smaller than that which is shown in FIG. 21 and which is discriminated to be blue.

Then, the signal 310C discriminated to be black is supplied to a binarizing circuit 200. The red and blue signals 300R and 300C are respectively inverted by the corresponding inverting circuits 130R and 130C so that the red and the blue signals 300R and 300C are converted into signals 320B and 320A. Since the signal 320B is in the form obtained by inverting the red brightness signal 300R, it is converted into a Cyan density signal. Since the signal 320A is in the form obtained by inverting the blue brightness signal 300C, it is converted into a red density signal.

Selectors 150 and 160 shown in FIG. 5 are controlled by an I/O port (omitted from illustration) of the above-described CPU 42a so as to make its control line to be "0" when the red component is separated, while the same makes its control line to be "1 when the blue component is separated. That is, when the red component separation is selected, the signal 310A is selected as the signal 330 and the signal 320A is selected as the signal 340.

Then, the operation to be performed when the red component is separated, that is, the operation to be performed when the control lines of the selectors 150 and 160 are respectively made to be "0" will be described.

Figure 8:
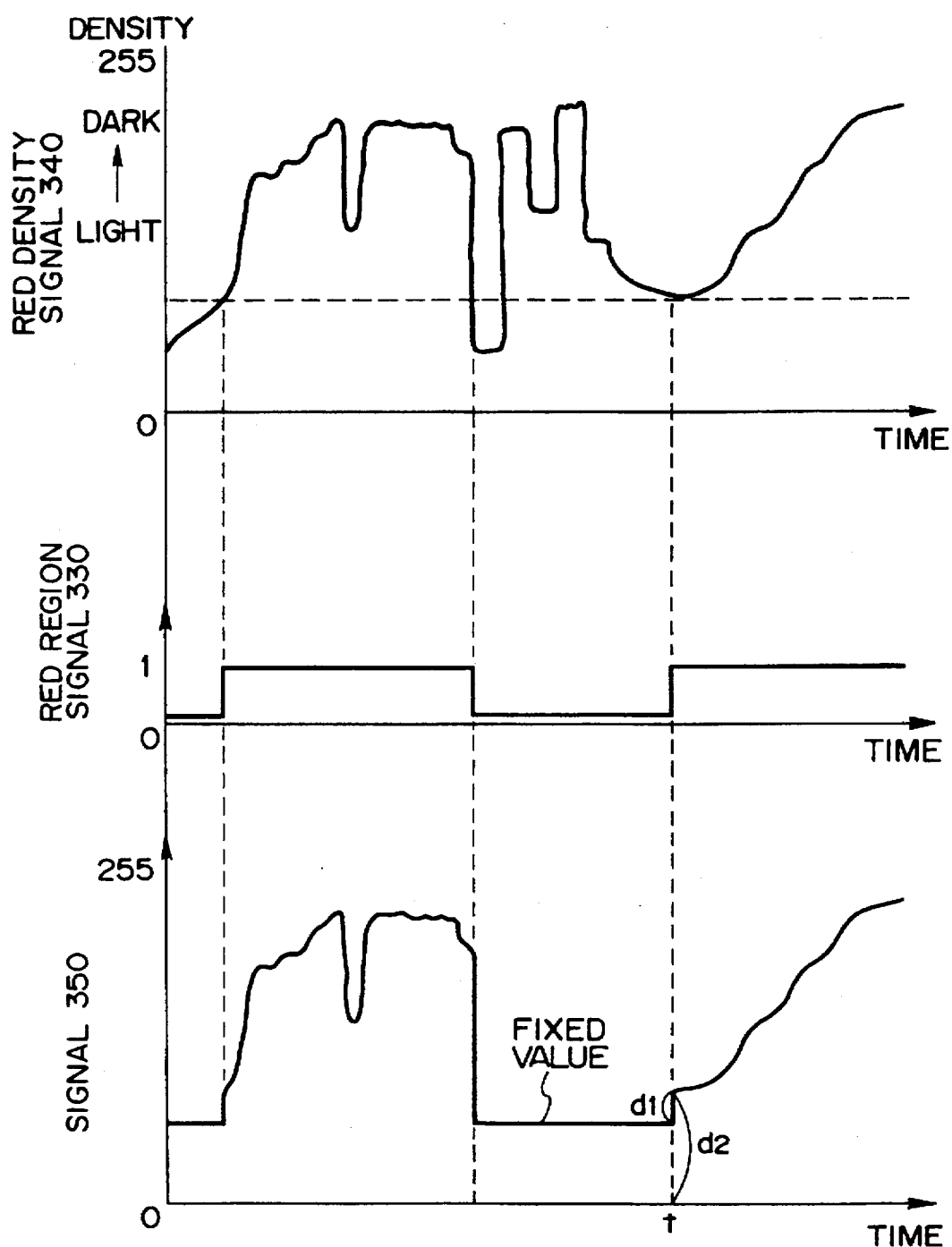
FIG. 8 illustrates a selection process of a density signal.

The red density signal 340 selected by the above-described selector 150 is supplied to the x-terminal of the selector 170, while the y-terminal has received a fixed value (it is "32" according to this embodiment). A red region signal 330 is supplied to a control terminal S of the selector 170. Furthermore, as shown in FIG. 8, if the signal supplied to the control terminal S is "1", the red density signal 340 is selected. If the same is "0", the fixed value is selected.

The reason why a constant except for "0" is selected as the fixed value in the case where the red region signal 330 is "0" will be described below.

That is, if the red density signal 340 is made to be "0" when the determination has been made to be any one except for red, the density difference across time t becomes $d_2$ which is undesirably larger than $d_1$ which is the difference realized when a constant except for "0" is employed as the fixed value. In consequence, the image quality deteriorates since the boundary of binary data across time t is excessively emphasized by the edge emphasizing action of an edge emphasizing circuit 180, to be described later, even if the subject portion is a moderately-changed except for the edge portion. Accordingly, the above-described problem is overcome by employing a positive (non-zero) constant as the fixed value.

The above-described fixed value is not limited to "32" and it may be changed by a red component process and a blue component process. Furthermore, a structure may be employed in which an operator is able to select a plurality of fixed values in order to obtain a desired image quality.

Furthermore, a structure may be employed in which a contact between the red image and the black image is extracted so as to control the selector 170 in accordance with the thus extracted contact information and the red region signal 330.

FIG. 22 illustrates a case where a red circular image is present in a black image in which there are the red region signal 330 showing the red region and contact information showing a portion in which the red image and the black image are positioned in contact with each other. Subsequently, a portion obtained by subtracting contact information from the red region signal 330 is made to be a control signal 330' which is then supplied to a terminal S of the selector 170.

FIG. 23 illustrates how the density information 340 is selected from the above-described control signal 330'.

If the red density information 340 is simply selected in response to the red region signal 330, black information is undesirably mixed with the desired red region at a point at which black image is changed to a red image due to the resolution of the CCD. Accordingly, according to this embodiment, a contact signal changing from black to red and that changing from red to black are used to generate the control signal 330' for controlling the selector 170. Thus, a signal 350 for only a desired red region can be extracted.

The contact information can be extracted by interposing a circuit, which acts to detect a portion in which the red region signal is inverted from "0" to "1" or from "1" to "0", between the selector 160 and the selector 170.

Figure 24:
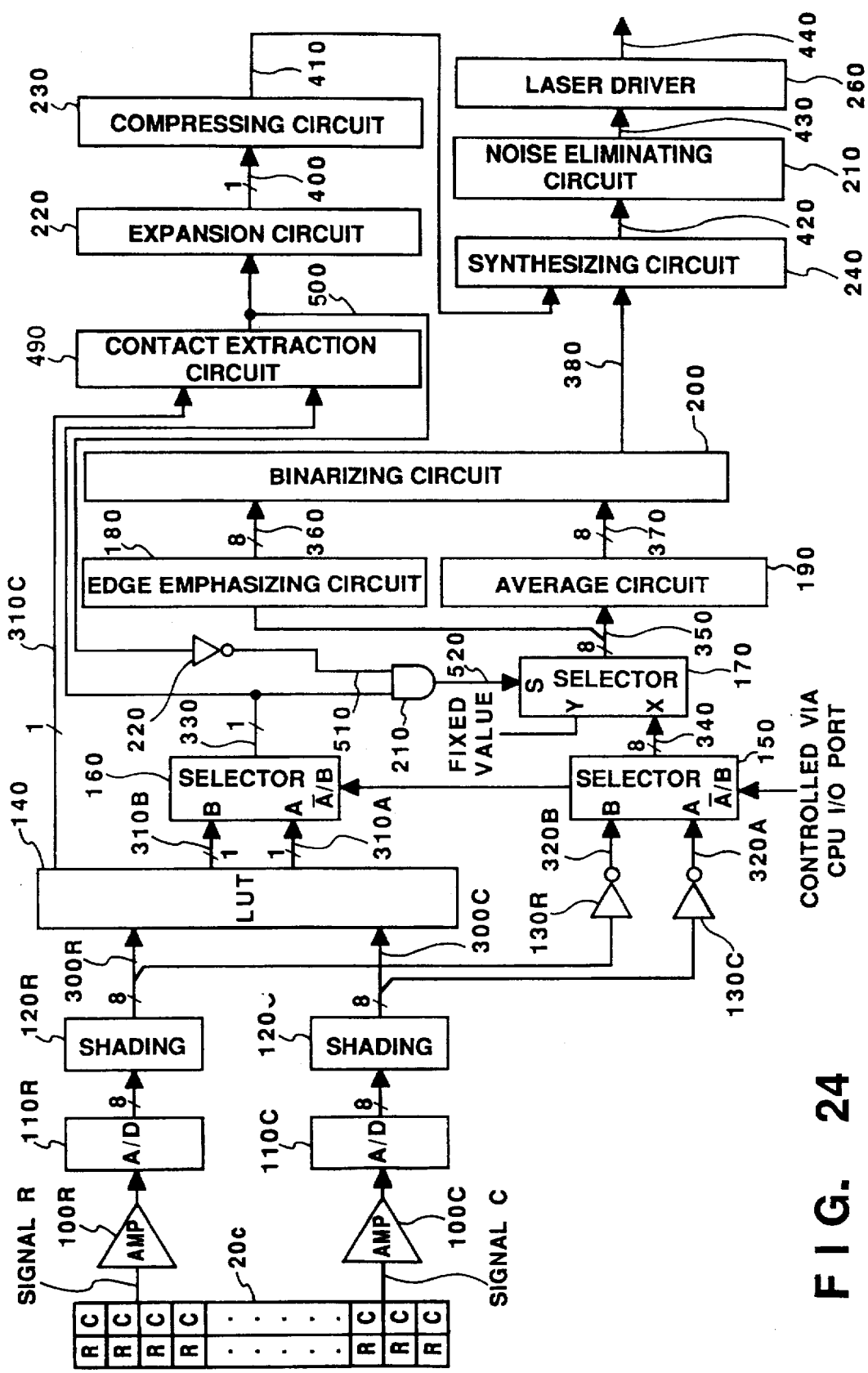

Furthermore, another structure as shown in FIG. 24 may be employed in which a contact signal 500 is extracted by a contact extracting circuit 490 from the above-described black discriminating signal 310C and the red region signal 330. Subsequently, a logical product of a signal 510, which has been formed by inverting the contact signal 500 by an inverting circuit 220, and the red region signal 330 is calculated so as to be supplied, as a control signal 520, to the control terminal S of the selector 170.

Subsequently, the output signal 350 from the selector 170 is supplied to the edge emphasizing circuit 180 and an averaging circuit 190.

The edge emphasizing circuit 180 comprises a conventional edge emphasizing filter and acts to emphasize the edge portion of the input signal 350. The averaging circuit 190 averages a subject pixel of the input signal 350 by its 9×9 matrix. Signals 360 and 370 transmitted from the edge emphasizing circuit 180 and the averaging circuit 190 are respectively supplied to the binarizing circuit 200. The binarizing circuit 200 makes a comparison between the 8-bit output signal 360 transmitted from the edge emphasizing circuit 180 and the 8-bit output signal 370 transmitted from the averaging circuit 190 so as to transmit a 1-bit red signal 380.

The size of the filter for performing the edge emphasizing operation and the smoothing operation is not limited to the above-described size.

As described above, since an image the edge of which has been emphasized is binarized while using the average value as a threshold, a light tone image such as yellow can properly be binarized. Furthermore, undesired obscure edge of the image, which will easily be generated at the time of the binary operation, can be prevented.

Figure 9A:
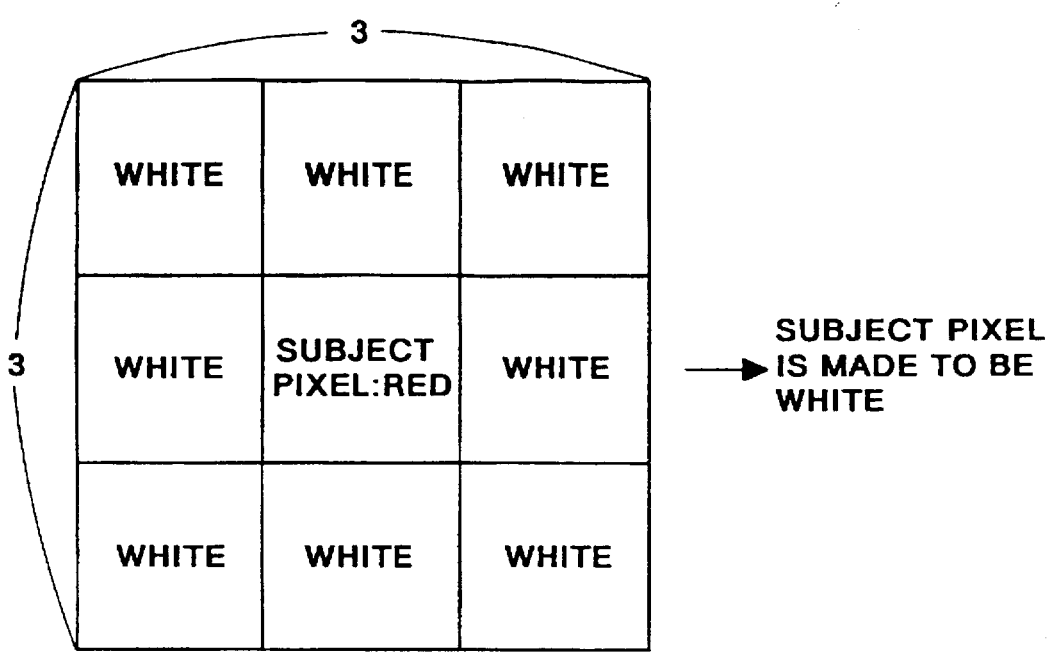
FIGS. 9A and 9B illustrate a noise eliminating operation according to the first embodiment of the present invention.
Figure 9B:
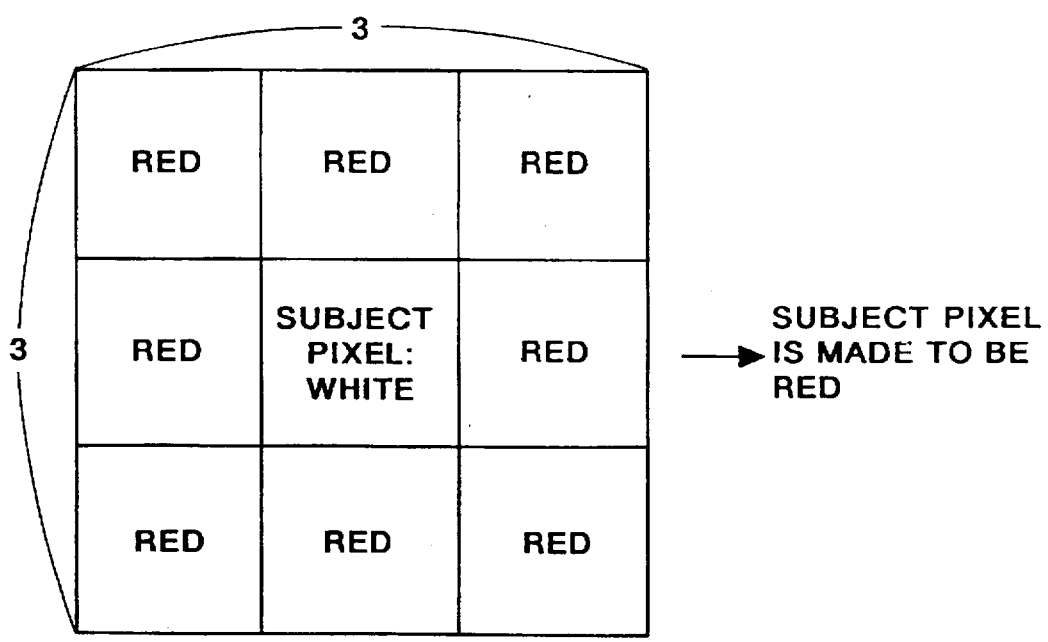

The red signal 380 binarized by the binarizing circuit 200 is supplied to a noise eliminating circuit 210 so that noise of the red signal 380 is eliminated. The noise eliminating circuit 210 is composed of a 3×3 filter as shown in FIGS. 9A and 9B so as to eliminate noise by converting isolated red information present in white information into white information or converting isolated white information present in red information into red information. Output signals 390 transmitted from the noise eliminating circuit 210 are supplied to an expansion circuit 220 and a synthesizing circuit 240.

The expansion circuit 220 has a contact extracting function for detecting a portion in which black information and red information are positioned in contact with each other and an expansion function for expanding the extracted contact. The expansion circuit 220 receives the black information 310C which has passed through the binarizing circuit 200 and the red information 390 from which noise has been eliminated. First, the contact extracting function will now be described with reference to FIGS. 10A to 10C.

The contact extraction is performed in such a manner that contact information about the subject pixel is "1" in a case where an image is, as shown in FIG. 10A, composed of a 3×3 matrix and information for both red and black components are included in 4 pixels surrounding the subject pixel. On the contrary, contact information about the subject pixel is "0" in a case where no information about both red and black components is included in 4 pixels surrounding the subject pixel. FIG. 10C illustrates contact information when a red image and a black image are intersected.

Then, the expanding function of the expanding circuit will now be described with reference to FIGS. 11A and 11B.

FIG. 11A illustrates a basic matrix for performing the expansion. As shown in FIG. 11A, the basic matrix has a size of 9×9 and is arranged in such a manner that the subject pixel is "1" in a case where contact information is present in the matrix except for the subject pixel when the same is "0" in a case where no contact information is present. FIG. 11B illustrates two contact information items A and B which have been expanded by the matrix shown in FIG. 11A. Referring to FIG. 11B, expansion information A is obtained by expanding contact information A, the expansion information A being designated by an alternate long and two short dashes line. Expansion information B is obtained by expanding contact information B, the expansion information B being designated by an alternate long and a short dash line.

The present invention is not limited to the size of the matrix to be expanded to 9×9.

The expansion information items A and B pass through a signal line 400 so as to be supplied to a compression circuit 230. The compression circuit 230 also has a 9×9 matrix (see FIG. 11A) in which the subject pixel is "1" in a case where all the pixels in the matrix except for the subject pixel are expansion information. On the contrary, the subject pixel is "0" in the other case. The size of the matrix to be compressed may be made to correspond to the ratio of the expansion or may be made smaller or larger than the same. The set of information "1" is, as compression information 410, supplied to a synthesizing circuit 240 to be described later so as to be synthesized with a signal 390 transmitted from the noise eliminating circuit 210.

Then, the operation of the synthesizing circuit 240 will be described with reference to FIG. 13.

As shown in FIG. 13, the synthesizing circuit 240 synthesizes the red information signal 390 separated from a state where the red and black images intersect and a compression information signal 410 transmitted from the compression circuit 230 so as to transmit a synthesized signal 420. That is, a want of red information generated due to the intersection between a red image and a black image can be interpolated by synthesizing the red information signal 390 and the compression information signal 410.

Therefore, if a position at which the black latent image is formed by an analog system and a position at which the red latent image is formed by a digital system are deflected from each other due to an influence of a mechanical accuracy, an image quality deterioration can be prevented and an image satisfactorily approximating the original can be formed.

Subsequently, the output signal 420 transmitted from the above-described synthesizing circuit 240 is supplied to a reproduction ratio varying circuit 250 so that a predetermined reproduction process is performed in response to an instruction issued from the operating unit 41. An output signal 430 transmitted from the reproduction ratio varying circuit 250 is supplied to a laser driver circuit 260 in which it is processed for the purpose of operating the laser 26. The laser 26 converts the electric signal 44 transmitted from the laser driver circuit 260 into optical information, the optical information being then reflected by the polygonal mirror 25a. In consequence, a latent image of red information is formed on the photosensitive drum 11.

(4) Development of red image

Then, the process of developing the latent image of the red image will be described with reference to FIGS. 1 and 3.

Red information formed in the form of the latent image on the photosensitive drum 11 by the laser 26 is developed by the red image developing unit 13b. The cut sheet SH which has been subjected to the black development process and conveyed to the resist roller 12 is conveyed when the development process commences so that a red toner image is transferred to the cut sheet SH on the surface of the photosensitive drum 11. After the above-described transference process has been ended, the cut sheet SH is separated from the photosensitive drum 11 by the separation charger 16 before it is conveyed to the fixing device 19. The fixing device 19 fixes, by utilizing heat and pressure, the red toner image formed on the cut sheet SH. The cut sheet SH on which the black and red information items have been recorded is delivered into the delivery tray 24 by line flapper 21.

Figure 17:
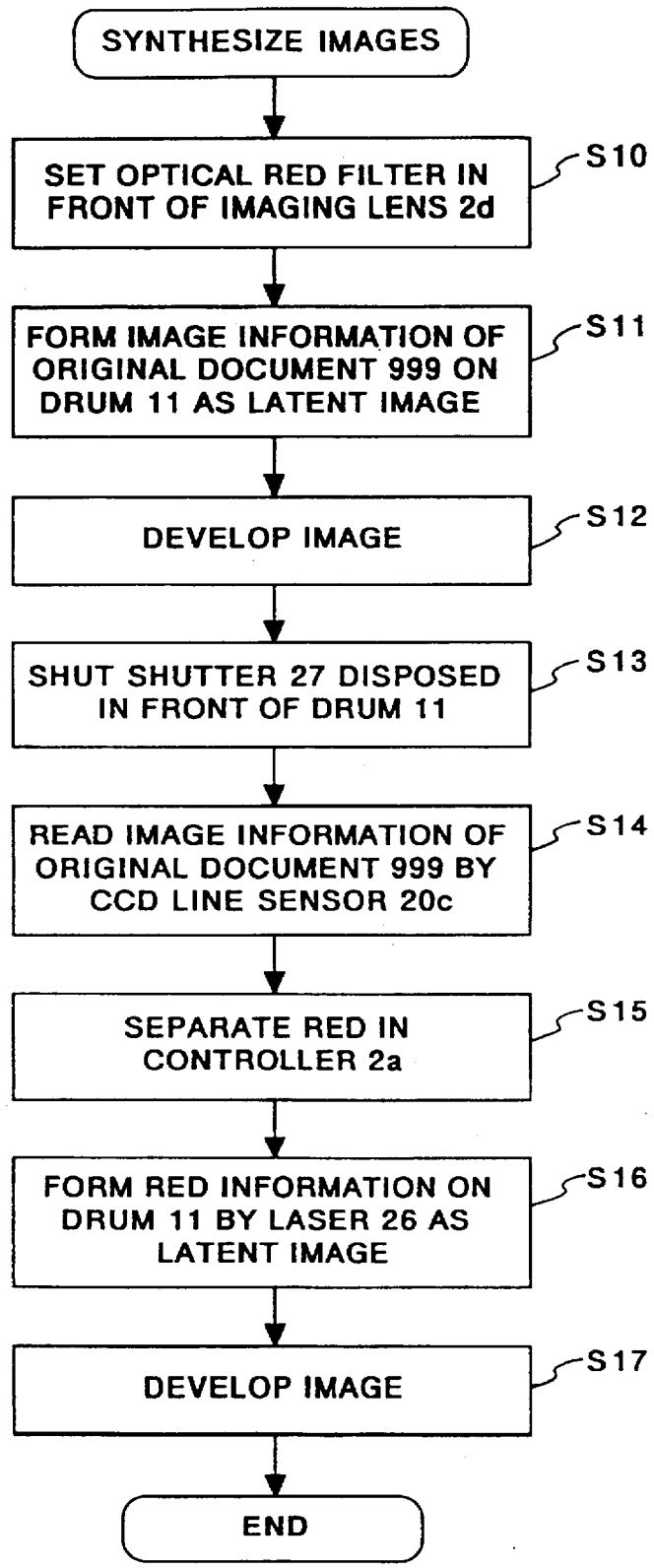
FIG. 17 is a flow chart which illustrates an image synthesis according to the first embodiment of the present invention.

FIG. 17 is a flow chart which illustrates a process of synthesizing images by an apparatus according to the present invention.

In order to erase (to separate the red analog image from the black image contained in the original document 999) the red analog image contained in the original document 999, the optical red filter 20d is set in front of the imaging lens 2d (step S10). Then, the original document 999 is supplied with light emitted from the original document illuminating lamp 2c via the scanning mirror. Light reflected from the original document 999 is introduced into the optical red filter 20d so that residual image information of the original document 999 from which only the red image information has been erased passes through the imaging lens 2d. Then, the image information is imaged on the photosensitive drum 11 so that a latent image corresponding to the image from which the red image has been omitted is formed (step S11). Furthermore, a black latent image from which the red image has been omitted is developed by the developing unit 13a (step S12). Subsequently, the developed black image is transferred to the cut sheet SH in accordance with a known electronic photographic process before the cut sheet SH is separated by the separation charger 16. The toner image is heated and applied with pressure by the fixing device 19 so that it is fixed.

The direction in which the cut sheet SH, on which black image information has been recorded, is conveyed is controlled by the flapper 21. In order to prepare for the next image recording, the cut sheet SH passes through the conveyance passages 22 and 22a which constitute a multiple passage so as to be conveyed to the position at which the resist rollers 12 confronts. At this time, in step S13, the exposing shutter 27 disposed in front of the photosensitive drum 11 is closed to prepare for the ensuing red image recording operation (the digital image recording operation). As a result, optical information supplied from the imaging lens 2d is not imaged on the photosensitive drum 11.

Subsequently, the original document 999 is applied with light emitted from the original document lamp 2c via the scanning mirror. Light reflected from the original document 999 passes through the half mirror 20a so as to be imaged on the line sensor 20c and read by the same (step S14). The electric signal thus photoelectrically converted by the line sensor 20c is introduced into the controller 2a so as to be subjected to the red component separation process (step S15). The red image information thus separated is, as red recording information, applied to the laser driver 260. As a result, the semiconductor laser 26 which constitutes the digital image recording system is operated in a modulated manner so that a red latent image is formed on the photosensitive drum 11 due to scanning performed by the polygonal mirror 25a (step S16). Then, the red image is developed by the developing unit 13a (step S17) before the developed image is transferred to the cut sheet SH which has been again fed. The cut sheet SH to which the image has been transferred is separated by the separation charger 16 before the image has been fixed by the fixing device 19.

The cut sheet SH on which the black and red image information items have been recorded in the synthesized and multiple manner is delivered by the flapper 21 into the delivery tray 24. Thus, the overall process is ended.

If the structure is arranged in such a manner that the color of the color separating filter can be selected to correspond to the developed color to be set in the developing unit 13a, the image corresponding to the color to be developed can be, as a digital image, recorded in a synthesized manner with the analog image.

That is, dichromatic printing operation by using black and red and that by using black and blue can be similarly performed. Furthermore, three color printing operation by using black, red and blue and multicolored printing operation using the other color can also be performed.

As described above, according to the first embodiment, dichromatic color copying of an image can be performed by performing the multiple development.

<Second Embodiment>

A second embodiment of the present invention will be described with reference to the drawings.

Figure 18:
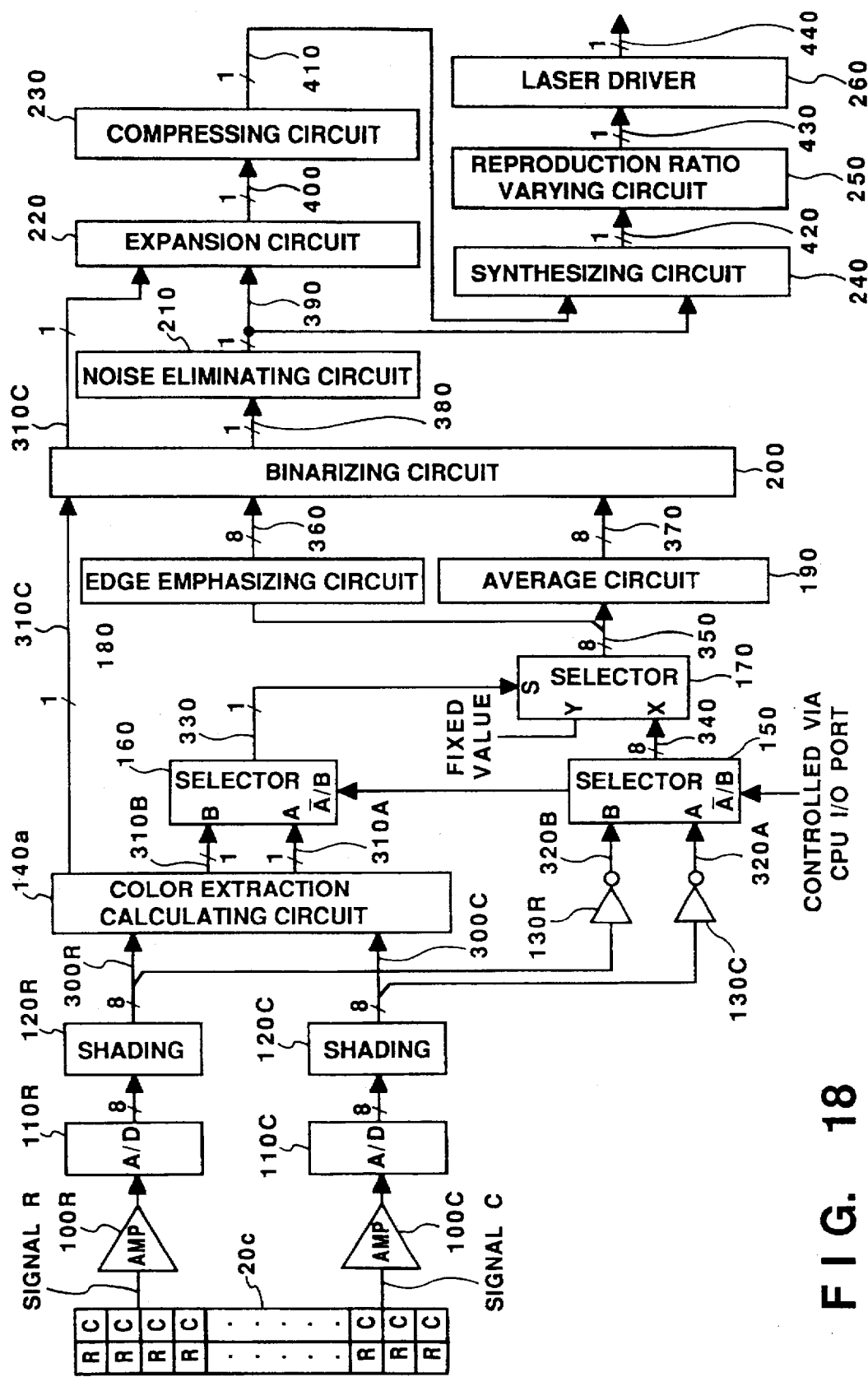
FIG. 18 is a block diagram which illustrates an image processing operation according to a second embodiment of the present invention.

FIG. 18 illustrates an image processing block according to the second embodiment, where the same processes as those according to the first embodiment are given the same reference numerals. Then, a color extraction calculating circuit 140a corresponding to the above-described look up table 140 will be described.

The color extraction calculating circuit 140a is arranged to act similarly the LUT 140 according to the fist embodiment, the color extraction calculating circuit 140a transmitting red discriminating signal 310A, the blue discriminating signal 310B, the black discriminating signal 310C in response to the input signals 300R and 300C. The operation performed by the above-described color extraction calculation circuit 140a will now be described.

Figure 19:
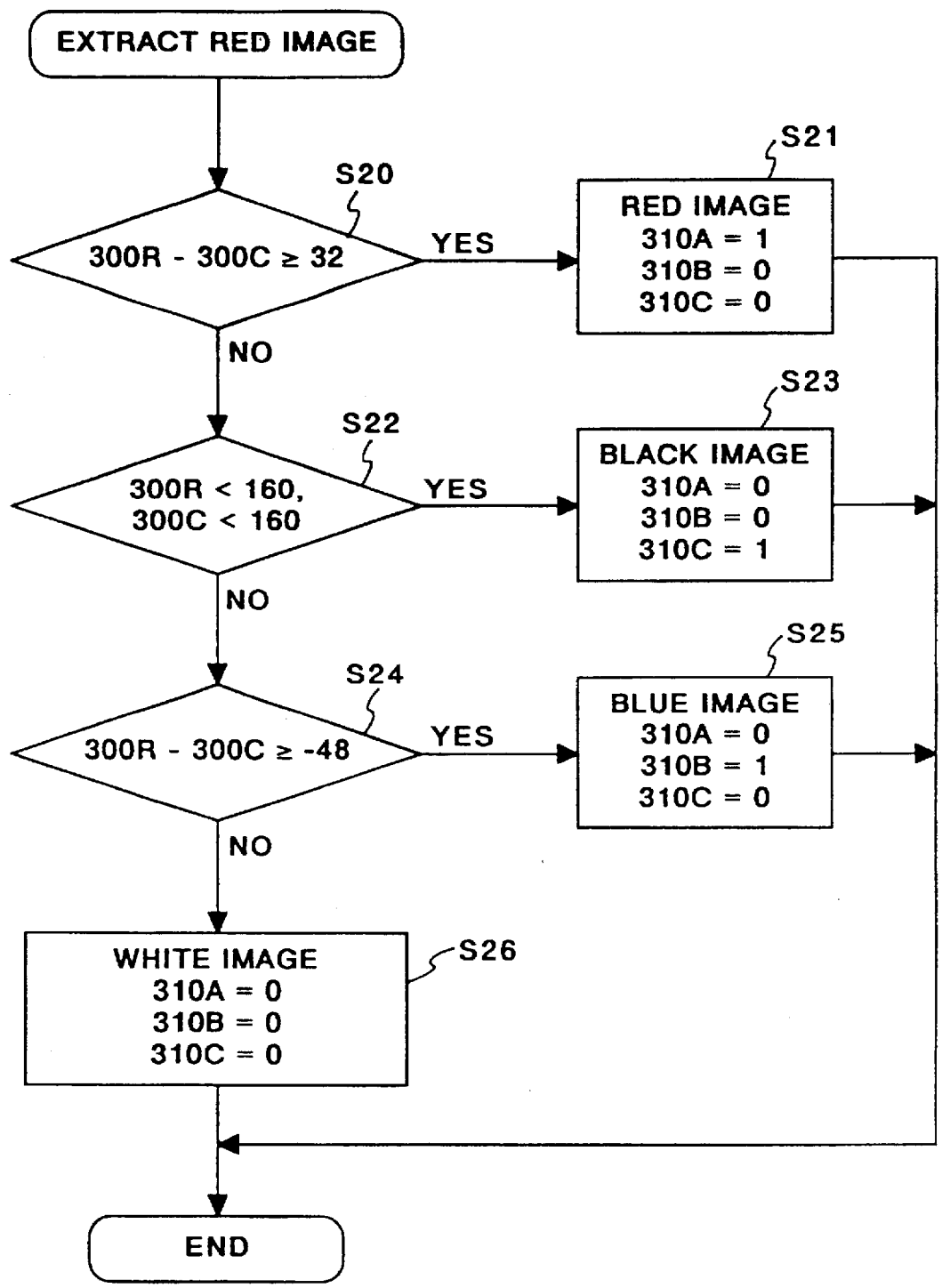
FIG. 19 is a flow chart which illustrates an image extraction process according to the second embodiment of the present invention.

FIG. 19 is a flow chart which illustrates calculations performed in the color extraction calculating circuit for extracting red image.

In order to obtain a range (see FIGS. 20 and 21) which is substantially the same as the range in which the red and blue components are distributed which can be erased by the optical red filter 20d, it is determined whether or not inequality (1) is held, where 300R is a 250-gradation red digital signal and 300C is the blue digital signal:

$$300R - 300C \geq 32 \quad (1)$$

If the above-described inequality (1) is held, the flow advances to step S21 in which a decision is made that the pixel is red and "1" is transmitted to the red discriminating signal 310A. If the same is not held, the flow advances to step S22 in which it is determined whether or not both the digital signal 300R and the blue digital signal 300C are smaller than "160". If both the digital signal 300R and the blue digital signal 300C are smaller than "160", the flow advances to step S23 in which a decision is made that the pixel is a black image so that "1" is transmitted to the black discriminating signal 310C. If the above-described conditions are not met, the flow advances to step S24 in which inequality (2) is calculated:

$$300R - 300C \leq -48 \quad (2)$$

If the above-described inequality (2) is not held, the flow advances to step S26 in which a decision is made that the pixel is a white image (except for the image), and the red discriminating signal 310A, the blue discriminating signal 310B and the black discriminating signal 310C are respectively made to be "0".

Subsequently, the selector 160 is switched over so that a color distribution shown in FIG. 20 is obtained at the time of extracting a red component while a color distribution shown in FIG. 21 is obtained at the time of extracting a blue component. Thus, a color distribution range approximating the color distribution range which can be erased by the optical filter can be obtained by the calculations.

As described above, according to the second embodiment, the color distribution range from which a predetermined color is erased and the range in which the extracted color is distributed are made coincide with each other. In consequence, an image of a good quality without undesirable overlap or want of an image can be formed.

<Another Embodiment>

Then, another embodiment of the present invention will now be described with reference to drawings.

Figure 14:
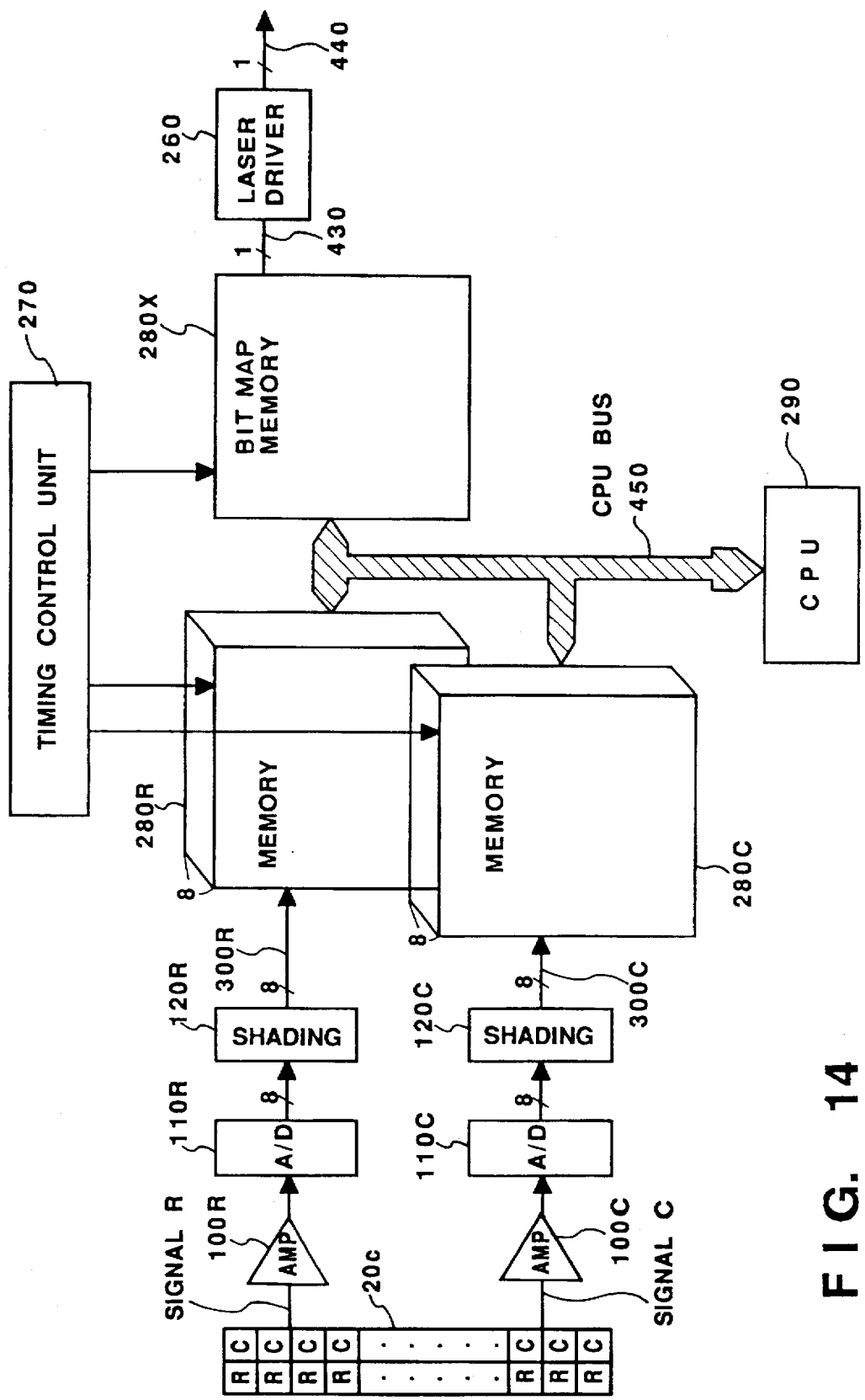
FIG. 14 illustrates an image processing operation according to the first embodiment of the present invention.

FIG. 14 is a block diagram which illustrates the structure of another embodiment of the image processing apparatus.

This embodiment is arranged in such a manner that processes to be performed by the shading circuits 120R and 120C to the laser driver 260 included in the image processing block shown in FIG. 5 are performed by a CPU. The same circuits as those according to the second embodiment are given the same reference numerals and descriptions about them are omitted here.

Since the latent image and developed image of the black image are the same as those according to the above-described embodiments, forming of a latent image on the photosensitive drum 11 will be described below.

As the operation to be performed previously to forming of a latent image of a red image, the shutter 27 shown in FIG. 1 is shut. When the shutter 27 is shut, supply of light information from the imaging lens 2d is shut. When the original document exposing lamp 2c and the scanning mirror are moved at this time by the optical system driving motor (optical motor) 2f in the direction designated by the arrow shown in FIG. 1, light is applied from the original document exposing lamp 2c to the original document 999 so that the original document 999 is scanned. Light reflected from the original document 999 passes through the half mirror 20a so as to be imaged on the CCD line sensor 20c by the lens 20b.

Then, signals R and C transmitted from the CCD line sensor 20c are, in the form of analog signals, supplied to the controller 2a. Then, image processing to be performed in the controller 2a will be described with reference to FIG. 14 which is a block diagram.

As shown in FIG. 14, signals R and C transmitted from the CCD line sensor 20c are respectively supplied to the amplifiers 100R and 100C. The amplifiers 100R and 100C amplify the corresponding signals R and C in such a manner that the output from each of the amplifiers 100R and 100C becomes the full scale at ensuing A/D converters 110R and 110C when the CCD line sensor 20c reads a white plate (omitted form illustration) provided in the original document scanning section 2.

Analog signals amplified by the amplifiers 100R and 100C are converted into digital signals by the ensuing A/D converters 110R and 110C so that 8-bit digital information is obtained. The outputs from the A/D converters 110R and 110C are supplied to the shading circuits 120R and 120C in which irregular sensitivity levels of the CCD line sensor 20c, nonuniform light quantities of the original document exposing lamp 2c and the like are corrected. The outputs 300R and 300C from the shading circuits 120R and 120C are respectively supplied to memories 280R and 280C.

Each of the memories 280R and 280C is a memory for expressing one pixel by 8 bits and has a capacity of A3 size, that is, a capacity capable of storing all of pixels for one frame by 8 bits. The output signals 300R and 300C are stored in the memories 280R and 280C by the timing controlling unit 270 in a hardware manner.

Then, processes of calculating image data stored in the memories 280R and 280C, the processes being performed by the CPU 290 via the CPU bus will be described.

According to this embodiment, a red and black color separation is performed.

Figure 15:
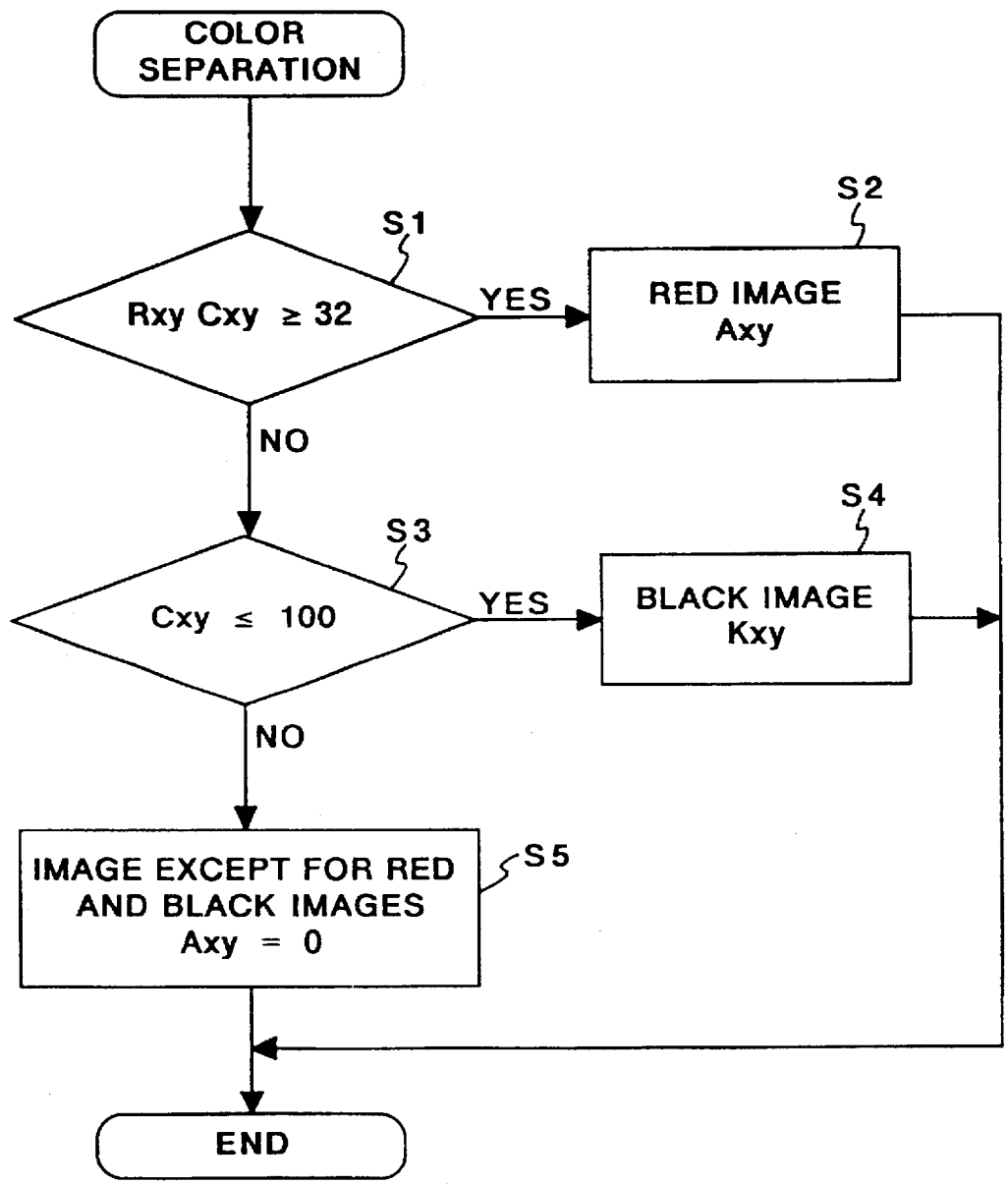
FIG. 15 is a flow chart which illustrates a color separation process according to another embodiment of the present invention.

First, the color separation will be described with reference to a flow chart shown in FIG. 15.

Assuming that image information about the same pixel position (x, y) stored in the memories 280R and 280C are $R_{xy}$ and $C_{xy}$, the color separation of red information is performed in such a manner that a determination is made that the subject image is a red image if equation (3) is held (when a decision of "YES" is made in step S1):

$$R_{xy} - C_{xy} \geq 32 \qquad (3)$$

where $0 \geq R_{xy}$ and $C_{xy} \leq 255$

It is assumed that the image decided that it/is a red image is $A_{xy}$, and $A_{xy}$ is obtained from Equation (4) (step S2):

$$A_{xy} = 255 - C_{xy} \qquad (4)$$

If Equation (5) is satisfied even if the image is not the red image, a decision is made that the image is a black image (when a decision "YES" is made in step S3):

$$C_{xy} \leq 100 \qquad (5)$$

Subsequently, let the image decided that it is the black image be $K_{xy}$ (step S4), and it is assumed that a case where the image is neither a red image nor a black image is $A_{xy}=0$ (step S5).

Then, the above-described red image $A_{xy}$ is subjected to an edge emphasizing process. The above-described edge emphasizing process is performed in such a manner that a calculation is performed by a 9×9 filter as shown in FIG. 16.

Letting the image which has been subjected to the edge emphasizing process be $E_{xy}$ and a coefficient denoting the degree of the edge be $\alpha$ ($\geq 0$), $E_{xy}$ can be obtained from Equation (6):

$$E_{xy} = A_{xy} + \alpha(4A_{xy} - A_{(x-4)y} - A_{(x+4)y} - A_{x(y-4)} - A_{x(y+4)}) \qquad (6)$$

The above-described red image $A_{xy}$ is subjected to an averaging process. The above-described averaging process is performed in such a manner that an area 9×9 is calculated similarly to the calculation performed according to the first embodiment.

Letting the averaged image be $S_{xy}$, it can be obtained from Equation (7):

$$S_{xy} = \frac{1}{81} \sum_{k=-4}^{k=4} \sum_{l=-4}^{l=4} A(x+k)(y+l) \qquad (7)$$

Subsequently, the above-described edge image $E_{xy}$ and the averaged image $S_{xy}$ are used to perform a binarizing process.

The red image is binarized in such a manner that, letting the result of the binarization calculation be $B_{xy}$, $B_{xy}=1$ in a case where $E_{xy} > S_{xy}$ and $B_{xy}=0$ in a case where $E_{xy} \leq S_{xy}$.

The noise elimination is performed by a 3×3 filter shown in FIGS. 9A and 9B in such a manner that two types of noise are eliminated.

First, as shown in FIG. 9A, let $B_{xy}$ be "0" when the subject pixel $B_{xy}$ is "1" and all of 8 pixels around the subject pixel are "0", that is, the image is a white image.

Furthermore, as shown in FIG. 9B, let $B_{xy}$ be "1" when the subject pixel $B_{xy}$ is "0" and all of 8 pixels around the subject pixel are "1", that is, the image is a red image.

As an expansion process, two types of processes are performed, that is, a contact point extracting process in which a portion in which black information is positioned in contact with red information is detected and an expansion process in which the extracted contact point is expanded are performed. The contact point extracting process is performed in such a manner that the contact point image $T_{xy}$ is made to be "1" in a case where the red image information ($B_{xy}=1$) and the black image information ($K_{xy}=1$) are included in a matrix 3×3 around the subject pixel.

The expansion process is a process in which obtained $T_{xy}$ is expanded similarly to that performed according to the above-described embodiments. In a case where contact point image $T_{xy}$ is present in a 9×9 matrix shown in FIG. 11A, the subject image is made to be "1". Image $U_{xy}$ formed by expanding the contact point image $T_{xy}$ shown in FIG. 11B is expressed by an alternate long and a dash line and an alternate long and two dashes line.

The compression process according to this embodiment is a process in which the expanded image $U_{xy}$ obtained by the above-described expansion process is compressed.

The compression process is performed by using a 9×9 matrix in such a manner that the subject image is made to be "1" when all of 80 pixels around the subject pixel are the expanded image $U_{xy}$ and compressed image $D_{xy}$ (hatched section) is formed from it.

The synthesizing process is a process in which the compressed image $D_{xy}$ obtained by the compression process and the red image $B_{xy}$ obtained by the noise eliminating process are synthesized. The result of that process can be expressed as shown in FIG. 13 similarly to the above-described embodiments.

The reproduction ratio varying process is a process in which synthesis information obtained by the above-described synthesizing process is subjected to a reproduction ratio varying process in accordance with the reproduction ratio instructed through the operating unit 41.

The above-described processes are performed by the CPU 290 and the result of the reproduction ratio varying process is stored in a bit map memory 280X shown in FIG. 14. Information stored in the bit map memory 280X is read out by the timing controlling unit 270 so as to be supplied into the laser driver via the signal line 430.

The laser driver 260 performs a process for causing the laser 26 to emit a laser beam. The laser 26 converts the electric signal 44 into optical information and make optical information to be reflected by the polygonal mirror 25a so that a latent image is formed on the surface of the photosensitive drum 11.

Since the development of the red image is the same as that according to the above-described embodiments, the description about it is omitted here.

As described above, the latent image of a red image is formed in such a manner that the CPU 290 performs a variety of processes. Therefore, dichromatic copying of an image composed of red and black can be performed by a simple structure.

The description according to the above-described embodiments is made in such a manner that the digital latent image is formed on the photosensitive drum 11 by the semiconductor laser 26 which constitutes the digital image recording system. Another structure may be employed which is arranged in such a manner that the digital image recording system is constituted by an LED array or the like in place of the semiconductor laser 26 so as to record the digital image. In this case, the size the digital image recording system can be reduced. Furthermore, the LED may comprise a type which performs the exposure in such a manner it is positioned in contact with the photosensitive drum.

According to the above-described embodiments, the image processing means performs the color separation process in such a manner that color decomposition filter performs the red and blue discriminating processes by using an output from the line sensor 20C having the red and Cyan filters. However, another structure may be employed which is arranged in such a manner that the ratio of red data R and Cyan data C is multiplied by constant k, the result of that calculation and slice levels Sr and Sb are subjected to a comparison and a determination is made in accordance with the result of the comparison.

Furthermore, the above-described digital recording system has a function of erasing the latent image when a portion in which forming of the analog latent image has been completed is exposed to light. In addition, the digital recording system has an add-on function when a portion in which the latent image has not been formed is exposed to light.

The digital color separation process may be performed by a hardware in which an LUT or the like is used in replace of the above-described structure in which it is processed by a software of the controller.

Although the above-described reading means comprises the 2-line CCD sensor, a mosaic type sensor may be employed which are alternately disposed for each pixel.

The present invention may be applied to another type color printer in replace of the above-described electronic photograph type color printer.

That is, the present invention is not limited to the above-described printer in which a latent image is formed on the photosensitive body. The present invention may be applied to a printer arranged in such a manner that special paper serving as the recording medium is directly exposed to light.

As described above, a color image containing a certain color and included in an original document image can be synthesized on an analog image as a binary image formed by simple binarization. Therefore, the structure revealing a reduced cost can be constituted in comparison to a structure in which the same is synthesized as a multi-value image. Furthermore, a variety of image synthesizing processes can be performed when the present invention is combined with a stamping function, the add-on function, the framing function and the blanking function which are the original functions of the digital image recording system.

Though the above-described analog recording system is not provided, in case the digital recording system is provided it is possible to carry out the present invention.

As described above, the image processing apparatus according to the present invention comprises: an analog recording system for forming an image on a recording medium by removing a predetermined color component from an original document image; a digital recording system for forming an image on the recording medium by extracting a predetermined color component from the original document image; and compensating means for compensating the boundary between images formed by the analog recording system and the digital recording system.

Therefore, if a slight positional deviation takes place between images formed by the digital recording system and the digital recording system, a want of color information can be prevented. Therefore, the deviation can be satisfactorily compensated so that an original image can be correctly reproduced.

As described above, according to the present invention, an effect can be obtained in that a want of color information can be corrected when a color image is separated.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus comprising:

input means for inputting color information;

color separation means for separating the color information input by said input means into a plurality of color components;

contact point extracting means for extracting a contact point of a plurality of colors in accordance with the color components relating to said colors;

expanding means for expanding a size of the contact point extracted by said contact point extracting means;

compression means for compressing a size of the contact point expanded by said expanding means; and processing means for processing the plurality of color components separated by said color separation means by using data of the contact point compressed by said compression means, wherein said expanding means expands the contact point so that a plurality of isolated neighboring contact points will be connected to each other.

2. An image processing apparatus according to claim 1, wherein said contact point extracting means is constituted by a predetermined matrix and arranged to transmit contact information in accordance with color information about pixels surrounding a subject pixel.

3. An image processing apparatus according to claim 1, wherein said expanding means is constituted by a predetermined matrix and arranged to transmit expansion information about a subject pixel.

4. An image processing apparatus according to claim 1, wherein said compression means is constituted by a predetermined matrix and arranged to transmit compression information about a subject pixel.

5. An image processing method comprising the steps of:

inputting color information;

separating the color information into a plurality of color components;

extracting a contact point of a plurality of colors in accordance with the color components relating to the colors;

expanding a size of the extracted contact point;

compressing a size of the expanded contact point; and processing the plurality of color components by using data of the compressed contact point, wherein the contact point is expanded in such manner that a plurality of isolated neighboring contact points will be connected to each other.

6. An image processing apparatus comprising:

input means for inputting image data;

binarizing means for binarizing the image data;

expanding means for expanding a size of an area represend by the image data which has been binarized by said binarizing means; and compressing means for compressing a size of the area expanded by said expanding means; and processing means for processing the image data representing the area compressed by said compressing means, wherein said expanding means expands the area so that a plurality of neighboring isolated points will be connected to each other.

7. An image processing apparatus according to claim 6, further comprising:

extracting means for extracting contact information of the input image data, wherein said binarizing means makes binary said contact information.

8. An image processing apparatus according to claim 7, wherein said contact information is boundary information in colors different from each other.

9. An image processing apparatus according to claim 8, wherein said colors are red and block.

10. An image processing apparatus according to claim 6, wherein said expanding means and said compressing means expand and compress the image data by blocking process.

11. An image processing apparatus according to claim 10, wherein common block size is used in said blocking process.

12. An image processing apparatus according to claim 6, further comprising;

compensating means for compensating input image data in accordance with the image data compressed by said compressing means.

13. An image processing apparatus according to claim 12, further comprising;

image forming means for forming an image in accordance with image data compensated by said compensating means.

14. An image processing apparatus according to claim 13, wherein said image forming means includes means for forming a latent image by scanning the photosensitive drum using laser beam.

15. An image processing apparatus comprising:

input means for inputting color image data representing a plurality of colors;

extracting means for extracting a boundary area of the colors from the color image data;

expanding means for expanding a size of the boundary area extracted by said extracting means; and compressing means for compressing a size of he boundary area expanded by said expanding means, wherein said expanding means expands the boundary area so that a plurality of neighboring boundary areas will be connected to each other.

16. An image processing apparatus according to claim 15, wherein said boundary of colors is the boundary between red and block.

17. An image processing apparatus according to claim 15, wherein said expanding means and said compressing means expand and compress the image data by blocking process.

18. An image processing apparatus according to claim 17, wherein common block size is used in said blocking process.

19. An image processing apparatus according to claim 15, further comprising;

compensating means for compensating input image data in accordance with the image data compressed by said compressing means.

20. An image processing apparatus according to claim 19, further comprising;

image forming means for forming an image in accordance with image data compensated by said compensating means.

21. An image processing apparatus according to claim 20, wherein said image forming means includes means for forming a latent image by scanning the photosensitive drum using laser beam.

* * * * *

UNITED STATES PATENT AND TRADEMARK OFFICE
CERTIFICATE OF CORRECTION

PATENT NO. : 5,748,797

DATED : May 5, 1998

INVENTOR(S) : MASANORI SAKAI, ET AL.                Page 1 of 3

It is certified that error appears in the above-identified patent and that said Letters Patent is hereby corrected as shown below:

COLUMN 1:

Line 24, "a" should be deleted.

COLUMN 3:

Line 54, "passe" should read --pass--.

COLUMN 4:

Line 17, "multiply" should read --multiple--.

COLUMN 5:

Line 49, "Symbols" should read --Symbol--.

COLUMN 7:

Line 55, "form" should read --from--.

COLUMN 9:

Line 18, "a" should be deleted.

COLUMN 12:

Line 5, "tho" should read --the--.

UNITED STATES PATENT AND TRADEMARK OFFICE
CERTIFICATE OF CORRECTION

PATENT NO.  : 5,748,797

DATED       : May 5, 1998

INVENTOR(S) : MASANORI SAKAI, ET AL.

It is certified that error appears in the above-identified patent and that said Letters Patent is hereby corrected as shown below:

COLUMN 13:

Line 16, "similarly" should read --similarly to--, and "fist" should read --first--;
Line 19, "the" should read --and the--; and
Line 67, "made" should read --made to--..

COLUMN 14:

Line 43, "form" should read --from--.

COLUMN 15:

Line 9, "$C_{xy} \leq 255$" should read --$C_{xy} \leq 255$.--; and
Line 10,, "it/is" should read --it is--.

COLUMN 16:

Line 58, "size" should read --size of--.

COLUMN 17:

Line 19, "are" should read --is--.

UNITED STATES PATENT AND TRADEMARK OFFICE
CERTIFICATE OF CORRECTION

PATENT NO. : 5,748,797

DATED : May 5, 1998

INVENTOR(S) : MASANORI SAKAI, ET AL.

It is certified that error appears in the above-identified patent and that said Letters Patent is hereby corrected as shown below:

COLUMN 19:

Line 9, "block." should read --black.--.

COLUMN 20:

Line 3, "he" should read --the--; and
Line 11, "block." should read --black.--.

Signed and Sealed this

Fifth Day of January, 1999

Attest:

Attesting Officer

Acting Commissioner of Patents and Trademarks